United States Patent [19]
Levecque et al.

[11] 4,015,963
[45] Apr. 5, 1977

[54] METHOD AND APPARATUS FOR FORMING FIBERS BY TORATION

[75] Inventors: Marcel Levecque, Saint-Gratien; Jean A. Battigelli; Dominique Plantard, both of Rantigny, all of France

[73] Assignee: Saint-Gobain Industries, Neuilly-sur-Seine, France

[22] Filed: Mar. 6, 1975

[21] Appl. No.: 555,811

Related U.S. Application Data

[63] Continuation-in-part of Ser. No. 353,984, April 24, 1973, Pat. No. 3,885,940.

[30] Foreign Application Priority Data

Feb. 21, 1975 France .......................... 75.05512

[52] U.S. Cl. ........................................ 65/5; 65/16; 264/5; 264/12; 264/176 F; 425/7
[51] Int. Cl.² .......................................... C03B 37/04
[58] Field of Search ...................... 65/5–8, 65/14–16, 12; 264/176 F, 5, 12; 425/7

[56] References Cited

UNITED STATES PATENTS

| | | | |
|---|---|---|---|
| 2,189,822 | 2/1940 | Thomas et al. | 65/5 |
| 2,515,738 | 7/1950 | Slayter et al. | 65/16 |
| 2,687,551 | 8/1954 | Stalego | 65/7 |
| 2,972,169 | 2/1961 | Stalego | 65/6 |
| 2,982,991 | 5/1961 | Karlovitz | 65/16 X |
| 3,357,808 | 12/1967 | Eberle | 65/7 |
| 3,634,055 | 1/1972 | Paymal | 65/6 |
| 3,885,940 | 5/1975 | Levecque et al. | 65/5 |

*Primary Examiner*—Robert L. Lindsay, Jr.
*Attorney, Agent, or Firm*—John T. Synnestvedt

[57] ABSTRACT

Method and apparatus for the production of fibrous materials from attenuable substances, particularly molten glass, are disclosed, along with the fiber products which result. In the disclosed system the material to be fiberized flows into a region established as a result of the interaction of a jet transversely oriented with respect to a larger jet or blast, the material being acted upon in the interaction zone to produce a highly attenuated fiber. Use of a tertiary jet is also disclosed for certain purposes.

30 Claims, 18 Drawing Figures

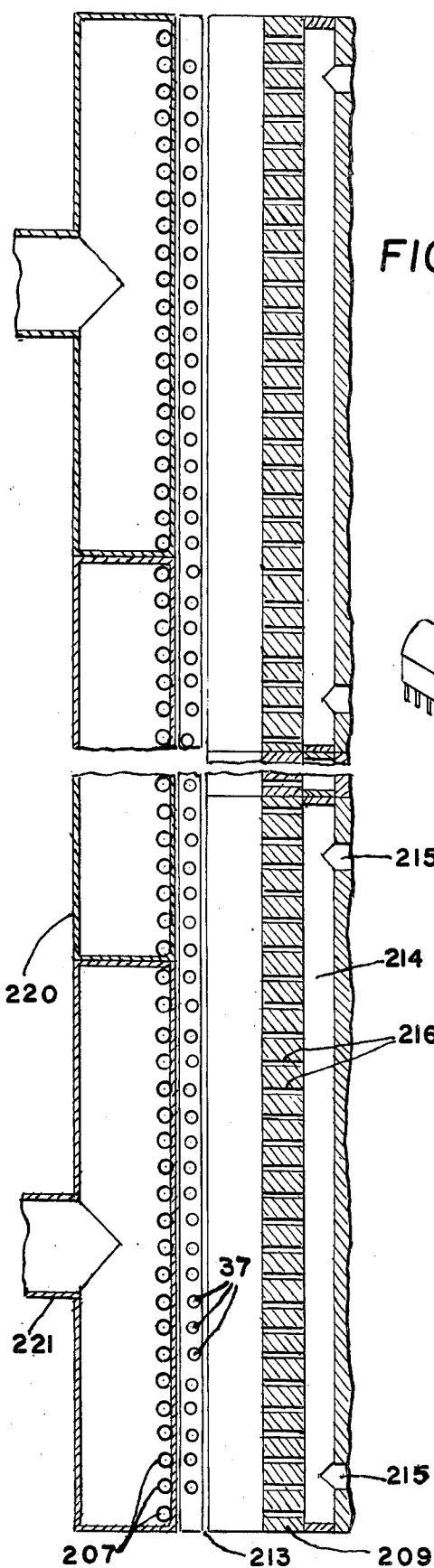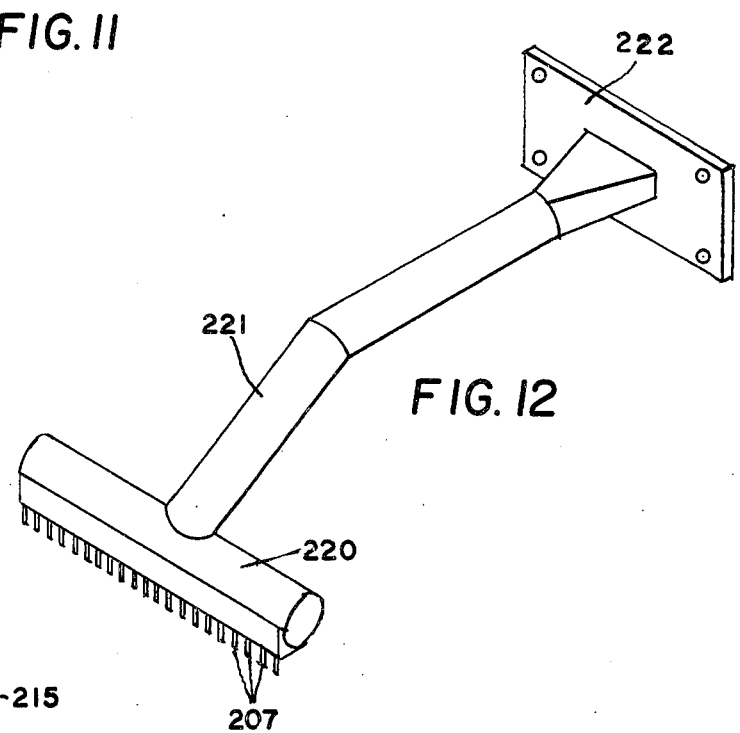

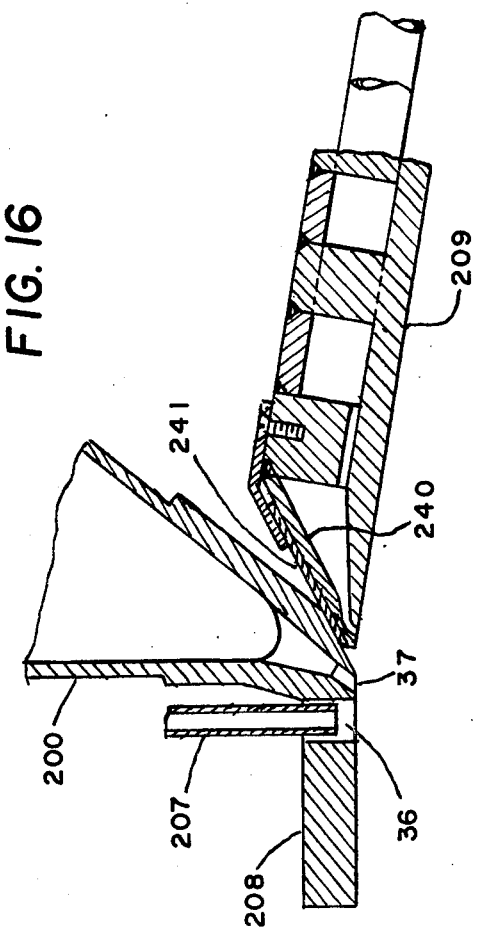

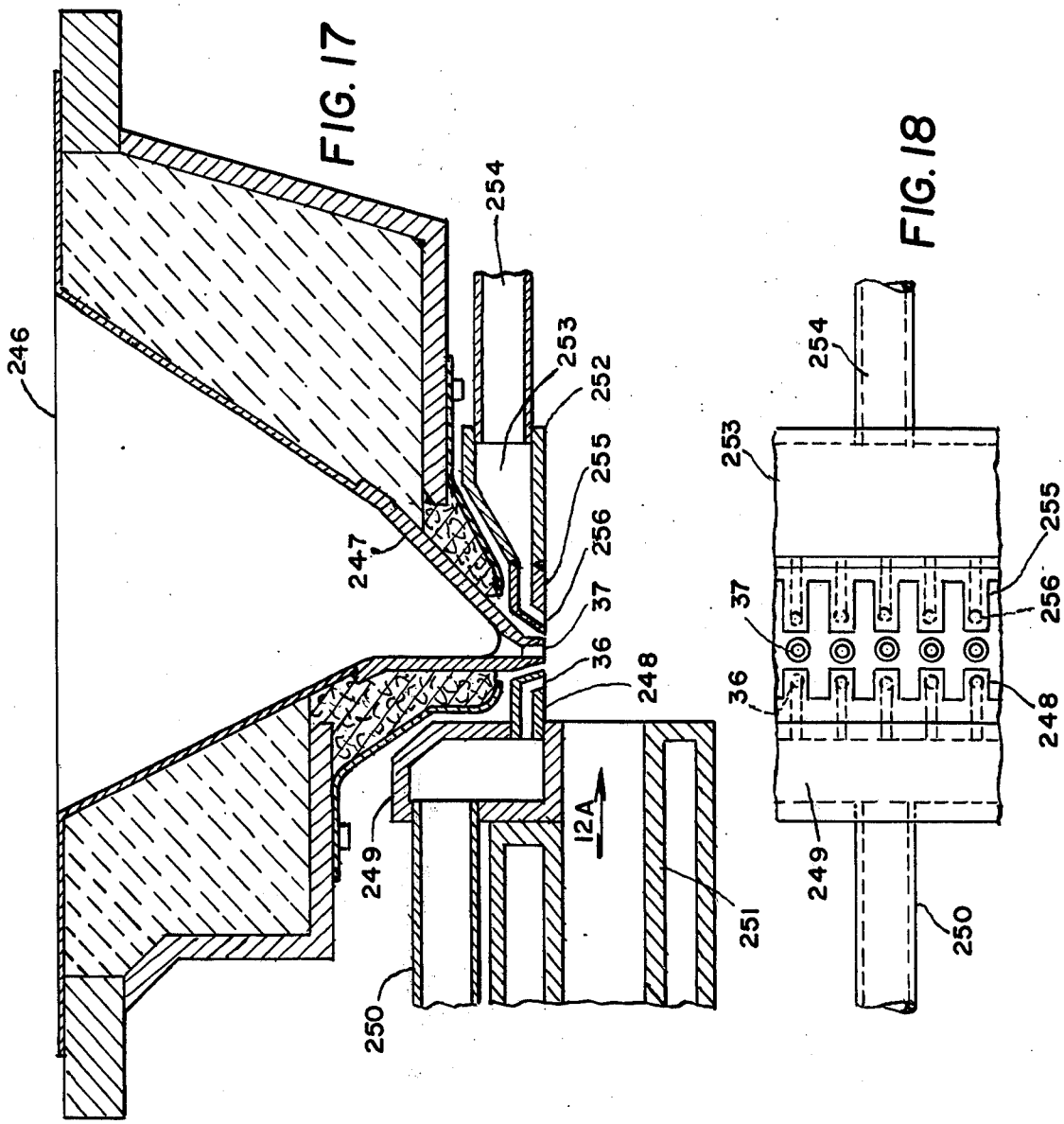

METHOD AND APPARATUS FOR FORMING FIBERS BY TORATION

CROSS REFERENCES

The present invention is a continuation-in-part of our prior application Ser. No. 353,984, filed Apr. 24, 1973, and issued May 27, 1975 as U.S. Pat. No. 3,885,940. Attention is also called to the fact that said prior application and also the present application discloses certain subject matter in common with application Ser. No. 353,983, filed Apr. 24, 1973, by two of the present applicants, and issued Apr. 1, 1975 as U.S. Pat. No. 3,874,886. The omission of claims directed to any features herein disclosed is not to be understood as an abandonment of that subject matter, because such features are claimed in companion copending applications.

TABLE OF CONTENTS

In connection with the following listing of the headings and in connection with the text of the specification between the headings as inserted in the specification, it is to be understood that not all of the text which intervenes between successive headings is necessarily directly related to the subject of the preceding heading, because in many instances interrlated subjects are jointly considered or are considered in overlapping sequence.

ABSTRACT
CROSS REFERENCES
TABLE OF CONTENTS
INTRODUCTION
BACKGROUND
STATEMENT OF THE PRIOR ART
1. Longitudinal Blowing
2. Strand
3. Aerocor
4. Centrifuging
ANALYSIS OF THE PRIOR ART
BIBLIOGRAPHY OF PRIOR PATENTS
OBJECTS AND ADVANTAGES
BRIEF DESCRIPTION OF DRAWINGS
BRIEF DESCRIPTION OF TORATION
FIG. 1
GENERAL STATEMENT OF VARIABLES
ANALYSIS OF TORATION—FIG. 2
JET INTERACTION ACTIVITY
ACTION ON GLASS
FIG. 3
FIG. 4
FIGS. 5–18

INTRODUCTION

The invention relates to fine fibers and to the production thereof from a substance in a condition in which it is capable of being attenuated, such substances being hereafter generally referred to as "attenuable materials", particularly attenuable materials which soften or liquefy upon entering a molten state as a result of the application of heat and which harden, or become relatively solid, upon cooling.

The process and equipment of the invention are especially suited to the formation of fibers from glass and the disclosure herein accordingly emphasizes glass fibers and their production.

BACKGROUND

There are four rather well-defined and recognized prior art techniques by which glass fibers can be made, these four techniques, which are mentioned at this point but discussed in more detail herebelow, being:

1. Longitudinal Blowing: Other terms sometimes used include "blown fiber", "steam blown wool", "steam blown bonded mat", "low pressure air blowing", or "lengthwise jets".
2. Strand: Other terms sometimes used are "continuous filament", or "textile fibers".
3. Aerocor: Another term sometimes used is "flame attenuation".
4. Centrifuging: Other terms sometimes used include "rotary process", "centrifugal process", "tel process", or "supertel process".

There are numerous variants of each of the above four processes, and some efforts in the art to combine certain of the processes. Further, there are other techniques discussed in the prior art by which prior workers have attempted to make glass fibers. However, the variants, attempted combinations, and attempted other techniques have not met with sufficient success to achieve a separate and recognizable status in the art.

The present application and the companion applications Ser. Nos. 353,983 and 353,984, above referred to are all concerned with a new, fifth technique which is unique in principle and practice, and which brings about unique results, and therefore is the starting point of a new art. Since the inventions of both the present and the companion applications are closely related, a full disclosure of the common subject matter of the present application and of the prior applications is included in the present application. Moreover, in the description of various embodiments of the common subject matter, unless otherwise indicated by statement or context, the references to "the invention" are not to be understood as limited to inventive subject matter of either the present application along or of either of the companion applications alone.

Because the subject matter concerns a new technique, and also because a diligent search has failed to reveal any suitable existing English word which aptyl applies to the new technique disclosed, we have coined the word "torate", a verb, and the word "toration", a noun, to refer to our new technique and product. The usage of these new words in the present specification will illuminate their meanings, but for present purposes it is pointed out that, by our new technique, glass can be "torated" into fibers, the jet and blast which cooperate to effect fiberization can be referred to as the "torating" current or blast, the fibers which result can be said to have been "torated", or to be "torated" fibers, and the process involved can be referred to as "toration".

STATEMENT OF THE PRIOR ART

Attention is now turned to a more detailed survey of the four prior art techniques briefly mentioned above. The numbers appearing within parentheses in the text below refer to prior art references fully identified in the bibliography set forth at the end of this section.

1. Longitudinal Blowing

Longitudinal blowing (see prior art items 1, 2, 3 and 4 in the bibliography below) is a glass fiber manufacturing process according to which melted glass flows from the forehearth hearth of a furnace through orifices in one or two rows of tips protruding downwardly from a bushing, the glass being thereby formed into multiple glass streams which flow down into an attenuating zone where the streams pass between downwardly converging gaseous blasts. The blast emitting means are located in close proximity to the streams so that the converging blasts travel in a downward direction substantially parallel to the direction of travel of the glass streams. Generally the glass streams bisect the angle between the converging blasts. The blasts are typically high pressure steam.

These are two longitudinal blowing techniques. In the first technique the attenuating blasts engage already drawn fibers and the product resulting is typically a mat, commonly known as "steam blown bonded mat", suitable for reinforcement. In the second longitudinal blowing technique the attenuating blasts strike directly on larger streams of molten glass and the product resulting is typically an insulation wool commonly known as "steam blown wool".

In a variation (see prior art item 5 of bibliography below) of the first longitudinal blowing technique, the entire bushing structure and associated furnace are enclosed within a pressure chamber so that, as the streams of glass emerge from the bushing, the streams are attenuated by pressurized air emerging from the pressure chamber through a slot positioned directly beneath the glass emitting tips of the bushing, this variation being commonly referred to as "low pressure air blowing", and products being commonly known as "low pressure air blown bonded mat and staple yarn".

2. Strand

The strand glass fiber manufacturing process (see items 6 and 7) begins in the manner described above in connection with longitudinal blowing, that is, multiple glass streams are formed by flow through orifices in tips protruding downwardly from a bushing. However, the strand process does not make use of any blast for attenuation purposes but, on the contrary, uses mechanical pulling which is accomplished at high speed by means of a rotating drum onto which the fiber is wound or by means of rotating rollers between which the fiber passes. The prior art patents in the field of the strand process are far too numerous to mention and are of no real significance to the present invention. Therefore, it is considered sufficient that the reference above are illustrative of the strand process.

3. Aerocor

In the aerocor process (see items 8 and 9) for making glass fibers, the glass is fed into a high temperature and high velocity blast while in the form of a solid rod, rather than flowing in a liquid stream as in the longitudinal blowing and strand processes discussed above. The rod, or sometimes a coarse filament, of glass is fed from a side, usually substantially perpendicularly, into a hot gaseous blast. The end of the rod is heated and softened by the blast so that fiber can be attenuated therefrom by the force of the blast, the fiber being carried away entrained in the blast.

4. Centrifuging

In the centrifuging glass fiber manufacturing process (items 10 and 11), molten glass is fed into the interior of a rapidly rotating centrifuge which has a plurality of orifices in the periphery. The glass flows through the orifices in the form of streams under the action of centrifugal force and the glass streams then come under the influence of a concentric and generally downwardly directed hot blast of flames or hot gas, and may also, at a location concentric with the first blast and farther outboard from the centrifuge, come under the action of another high speed downwardly blast, which latter is generally high pressure air or steam. The glass streams are thereby attenuated into fine fibers which are cooled and discharged downwardly in the form of glass wool.

ANALYSIS OF THE PRIOR ART

It has long been recognized that it is desirable to produce glass fibers exceedingly small in diameter, for example on the order of a few microns, because products made with such fine fibers have remarkable advantages, including strength, good thermal insulating capability and other physical properties. Further, while the length of the fiber is more or less significant according to the purpose for which the fiber is to be used, it is generally desirable that the fibers be long rather than short. Still further, it is highly advantageous, particularly from the standpoint of the economics of fiber production, that a high production rate be utilized in the manufacturing process employed. One way to reach a high production rate is to have a high orifice pull rate. By "orifice pull rate" we mean to denote the amount of production accomplished within a given time from a single fiber producing center. "A single fiber producing center" means one orifice emitting one glass stream in the longitudinal blowing process, the strand process, and the centrifuging process, and it means one rod of glass in the aerocor process. In toration it means one glass cone from which a single fiber is drawn. Pull rates for a given process are typically given in terms of kilograms, or pounds, or tons, per hour, or per 24 hour period.

To summarize, it is generally desirable to make very fine fibers, very long fibers, and to make fibers at a high orifice pull rate, but these objectives conflict with each other, insofar as prior art processes are concerned. Therefore it has always been necessary that a selection be made to sacrifice one or more desiderata in order to obtain the others. Further, each of the prior art processes can effectively serve to make only one or a narrow range of products. For example, by the strand process very fine continuous fibers can be made, but the orifice pull rate is low and the resultant product is not economically useable in the form of glass wool. On the other hand, the centrifuging process makes fibers at a relatively higher orifice pull rate but they tend to be short and they are produced in the form of wool and cannot by readily organized to make roving or other reinforcing products or textiles. The wool resulting from the centrifuging process is very satisfactory in products such as building insulation in which considerable ranges of fiber diameters and lengths in the finished product are satisfactory; however, where the insulation and product strength requirements are very high, other techniques of manufacture, such as the aerocor process, are generally employed.

The aerocor process makes long and fine fibers, if orifice pull rates comparable to those of the centrifuging process are used. But the aerocor process cannot be operated at an orifice pull rate high enough to effectively complete with the centrifugal process. As the orifice pull rate in the aerocor process is progressively increased, there is a corresponding increase, unavoidably, in fiber diameter, until a certain diameter is reached and if the orifice pull rate is increased even further, the glass rod utilized in the process will tend to pass through the gaseous blast without being completely melted and this results in the inclusion in the product of an unacceptably high number of bent pieces of relatively coarse glass fiber, these bent pieces being known as "hooks".

In the above described first longitudinal blowing technique the fibers in the bonded mat are long and uniform in diameter, but the orifice pull rates are relatively low. An attempt to increase the orifice pull rates generates unfiberized material having the shape of insufficiently drawn glass drops.

It is the prime characteristic of the invention to obtain fine and long fibers at very high orifice pull rates.

In the second longitudinal blowing technique the orifice pull rates can be very high, but the attenuating blasts break the glass streams prior to attenuation with the result that a large portion, even up to 50%, of the glass is unfiberized and lodges in the wool product in the form of slugs; further, the fiber is very short and irregular in diameter.

It is an important characteristic of the invention ot obtain the fine and long fibers at high pull rates, as discussed above, while at the same time producing fiber practically free of unfiberized material.

Many prior workers have made repeated efforts to optimize the manufacture of glass fibers by one or more of the processes which start with molten streams of glass. Various of these prior art techniques have been concerned with trying to optimize the attenuation process by extending or lengthening the attenuation zone, either by providing special means to accomplish the addition of heat to the streams of glass and to the embryonic fibers (item 12), or through the use of confining jets (items 13 and 14), or both (item 15).

The approach taken in the just mentioned prior art technique suggests that the realization of optimum fiberization lies in extending the length of the attenuating zone.

Contrary to such teachings, in the practice of the present invention, attenuation is accomplished in the course of a short path length, on the order of 1 to 2 centimeters. Therefore, as will be more readily apparent from the explanation of the subject invention which follows, it is an important characteristic of the invention that the fibers are removed, very early in the process, to a cool zone, in which no further attenuation is possible.

Various other approaches have been suggested for introducing glass in the molten state into an attenuating blast (items 16, 17, 18 and 19). In such attempts to introduce a stream of molten glass into an attenuating blast it has been noted that there often is a tendency of the glass stream to veer to a path of travel on the periphery of the blast, that is, to "ride" the blast, rather than penetrating into the core region of the blast where attenuating conditions are more effective. Suggestions have been made to deal with this "riding" problem, including the use of physical baffles as in Fletcher (item 16), and the transfer of substantial kinetic energy to the glass stream as, for example, by the modifications of the centrifuging process taught in Levecque (item 11), Paymal (item 18), and Battigelli (item 19).

An alternate approach to the problem, more closely akin to the aerocor process, has been the introduction of the glass in the form of a solid (item 9) or pre-softened (item 20) glass rod in or in the form of powdered glass (item 4).

In contrast, it is another important characteristic of the invention to introduce glass in the molten state, in a progressive and very stable way, into an attenuating zone where the attenuating parameters are the most efficacious.

BIBLIOGRAPHY OF PRIOR PATENTS

1. Slayter et al. U.S. Pat. No. 2,133,236
2. Slayter et al. U.S. Pat. No. 2,206,058
3. Slayter et al. U.S. Pat. No. 2,257,767
4. Slayter et al. U.S. Pat. No. 2,810,157
5. Dockerty U.S. Pat. No. 2,286,903
6. Slayter et al. U.S. Pat. No. 2,729,027
7. Day et al. U.S. Pat. No. 3,269,820
8. Stalego U.S. Pat. No. 2,489,243
9. Stalego U.S. Pat. No. 2,754,541
10. Levacque et al. U.S. Pat. No. 2,991,507
11. Levecque at al. U.S. Pat. No. 3,215,514
12. Stalego U.S. Pat. No. 2,687,551
13. Stalego U.S. Pat. No. 2,699,631
14. Karlovitz et al. U.S. Pat. No. 2,925,620
15. Karlovitz U.S. Pat. No. 2,982,991
16. Flectcher U.S. Pat. No. 2,717,416
17. Eberle U.S. Pat. No. 3,357,808
18. Paymal U.S. Pat. No. 3,634,055
19. Battigelli U.S. Pat. No. 3,649,232
20. Stalego U.S. Pat. No. 2,607,075

OBJECTS AND ADVANTAGES

In contract with all of the foregoing, it is a major objective of the present invention to provide a technique for producing glass fibers (as well as the resulting fibers themselves) in which it is not necessary to sacrifice any one of the major desiderata above referred to, namely, fineness of fiber, long fiber length and high pull rate.

Because of the accomplishment of the above major object, with the technique of the present invention it is possible to produce fibers adapted to a much wider range of uses than has been practicable with any one of the presently home techniques.

Another object of the invention is the provision of a technique for producing mineral fibers which is readily adaptable to adjustment of operating conditions so as to selectively product fibers adapted to a wider variety of uses than has been practicable heretofore. The broad range of fiber types and characters capable of being produced by the technique of the present invention makes it unnecessary in many situations to rely upon more than one technique or process for various different products. In the glass fiber industry this presents outstanding advantages because of the capability of producing a wider range of products with a single technique, thereby eliminating substantial investment in capital equipment which would otherwise be required in order to produce the same range of products by presently known or conventional techniques.

The invention further has in view the provision of a technique for producing glass fibers in which various limitations of the prior art techniques are eliminated. For example, the technique of the present invention requires only static equipment, in contrast with the widely used centrifuge method in which the fiberizing equipment rotates at high speed, thus necessitating special high precision machinery and maintenance. Static equipment makes it possible to construct the equipment from materials which have very high strength at high temperatures in static conditions, without the need to have high temperature strength in dynamic conditions. This allows fiberizing a broader range of materials.

As another example of eliminating prior art limitations, the technique of the present invention greatly simplifies and facilitates the introduction of molten glass into the interior of a blast for purposes of attenuation, the means or system for accomplishing such introduction of the glass in the process of the invention being explained more fully hereinafter. This feature of the invention is in striking contrast to various of the prior art systems for introducing glass into an attenuating blast, such as the aerocor process above described, in which a solid glass rod is fed into the blast, to be softened and melted. As above pointed out this type of system is severely limited with respect to pull rate and has a tendency to develop "hooks." In contract, the feed of the molten glass into the attenuating zone within the torating blast in the technique of the present invention makes possible much higher orifice pull rates than are possible with the aerocor process, and this is accomplished with the technique of the present invention with a negligible amount of unfiberized material and moreover, while maintaining fineness of fibers.

A still further object of the present invention is to provide a technique for making mineral fibers in which a wider variety of batch formulations may be utilized in the making of fibers, over a wide range of fiber properties or characteristics, than is possible with any one of the presently known processes.

The foregoing and other objects and advantages which are attained, including numerous specific advantages flowing from toration will be explained more fully hereinafter.

THE DRAWINGS

FIGS. 5 to 12 inclusive illustrate various parts of an embodiment according to the invention, incorporating provision for introducing a tertiary jet or gas, and in this group of figures —

Figure 5:
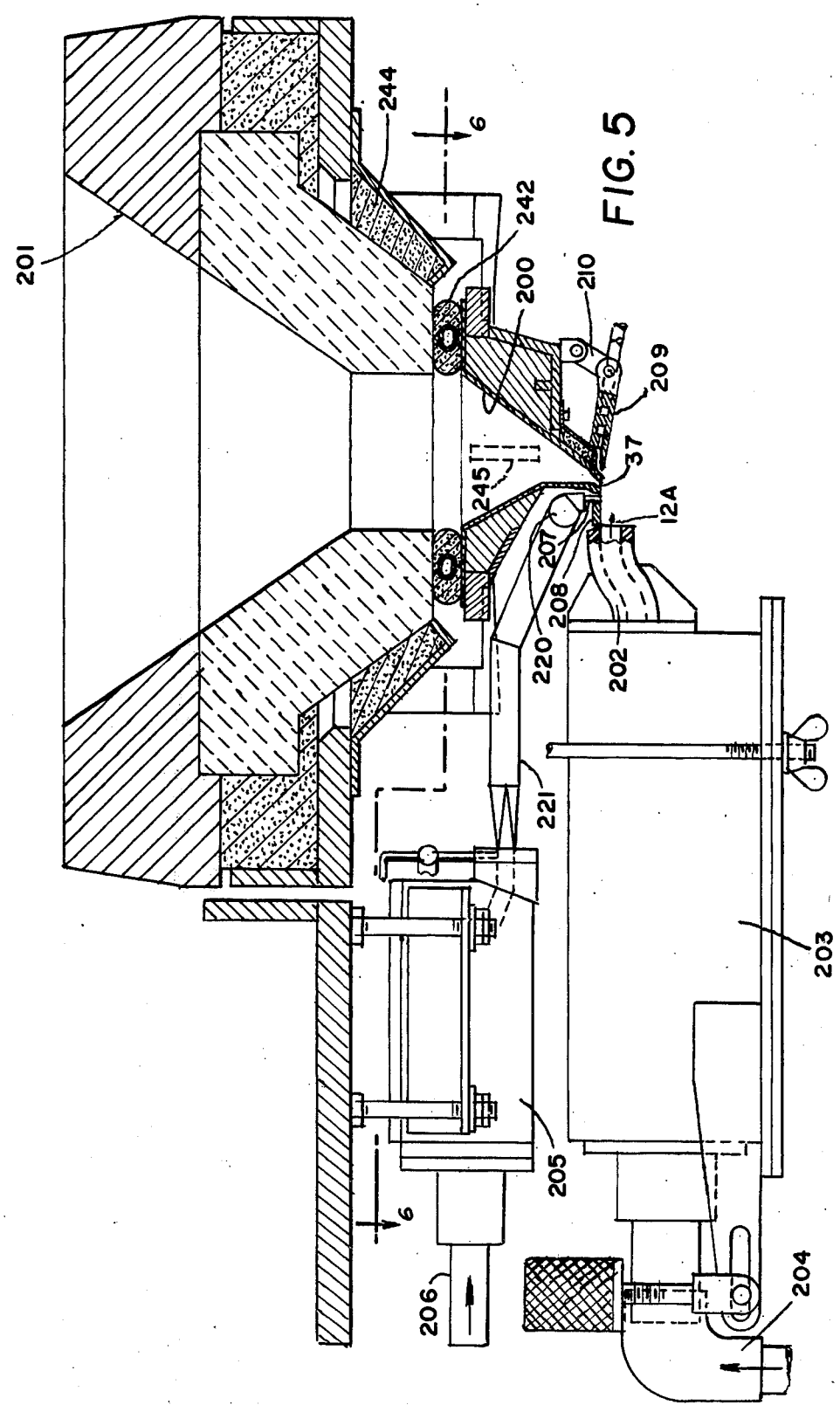
Figure 6:
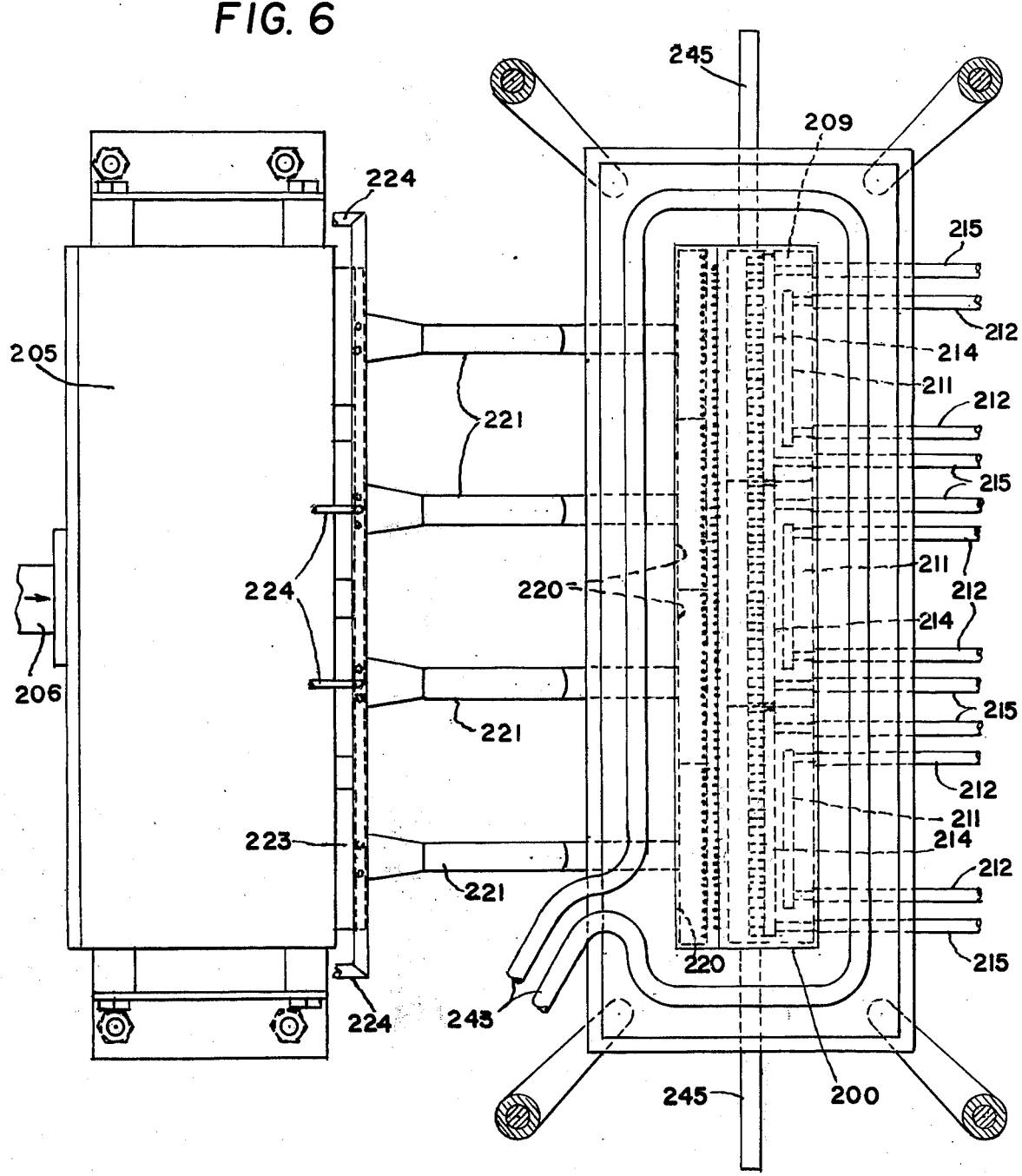
Figure 7:
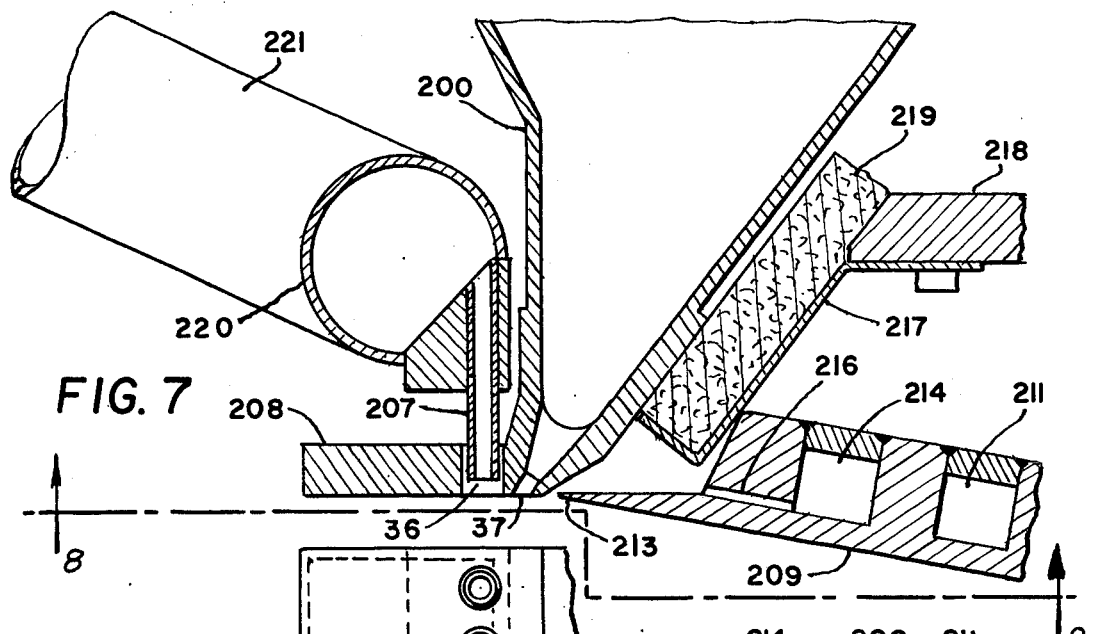
Figure 8:
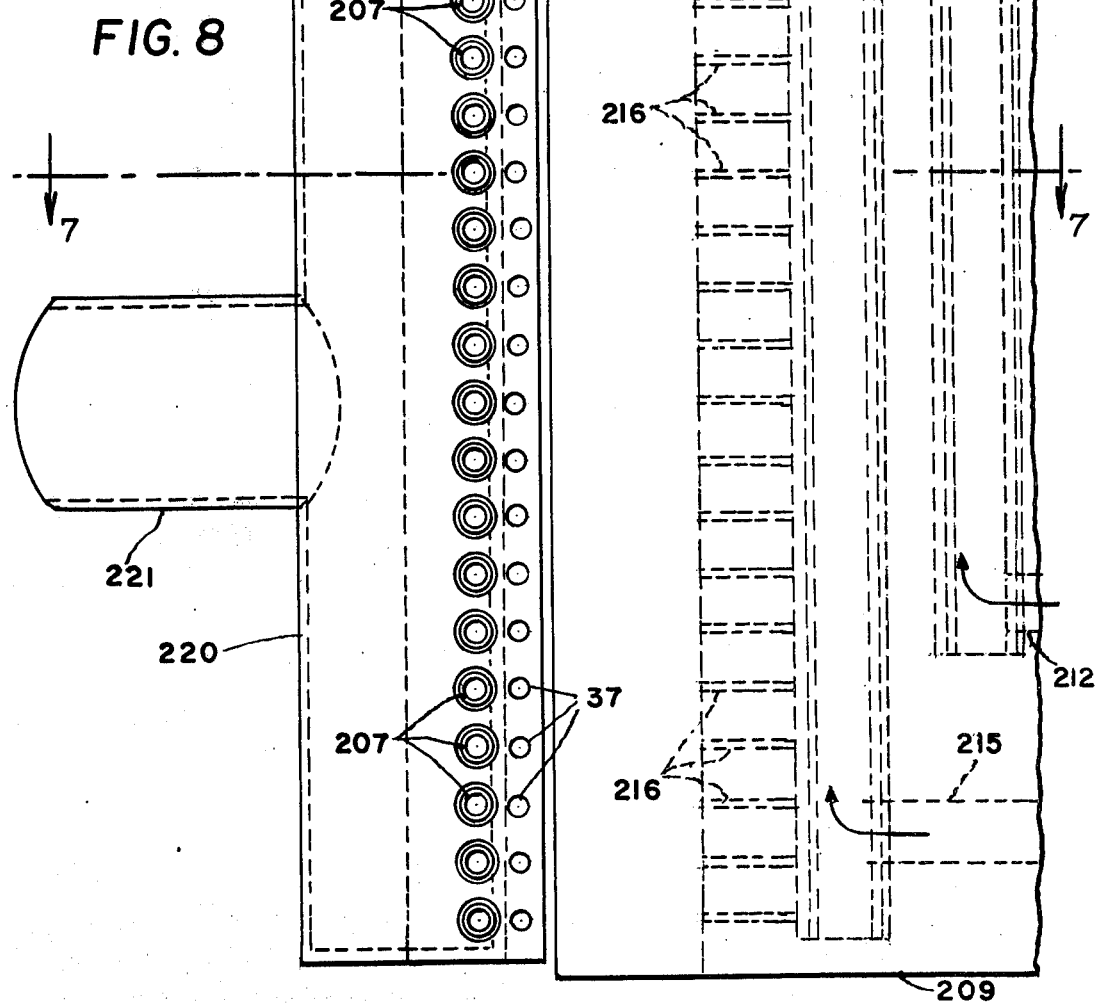
Figure 9:
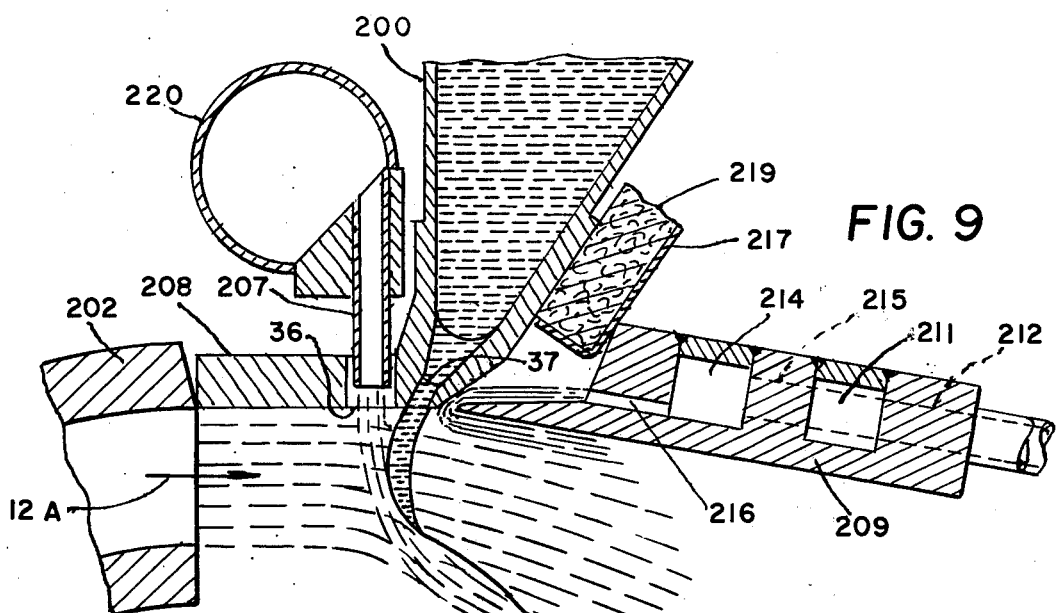
Figure 10:
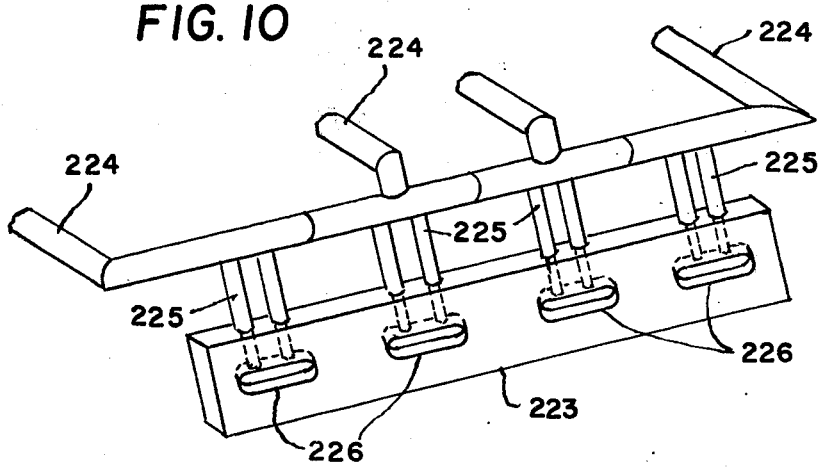

FIG. 5 is an elevational view partly in vertical section showing glass supply means, means for developing a blast and secondary jet, and further for introducing tertiary gas in the manner to be described;

FIG. 6 is a plan view of certain parts taken as indicated by the lines 6—6 on FIG. 5;

FIG. 7 is an enlarged vertical sectional view of the crucible or bushing, with an integral plate, this view also showing the association of the secondary jet and tertiary gas admission devices, this view being taken as indicated by the line 7—7 on FIG. 8;

FIG. 8 is a plan view looking upwardly at certain parts shown in FIG. 7, FIG. 8 being taken as indicated by the line 8—8 on FIG. 7;

FIG. 9 is a somewhat diagrammatic view of some parts shown in FIG. 7 and particuarly showing the fiberizing action achieved by the employment of not only the blast and secondary jet but also of the tertiary gas admission means;

FIG. 10 is an isometric view of certain gas supply and distributing means employed for supplying gas to the secondary jets;

FIG. 11 is a horizontal sectional view through certain of the parts at the fiberizing centers, the central portion of this view being broken out and the view showing the arrangement of certain parts making up a multiple center fiberizing installation; and FIG. 12 is an isometric view of equipment employed to mount a plurality of secondary jet tubes and supply such tubes with jet gas.

Figure 13:
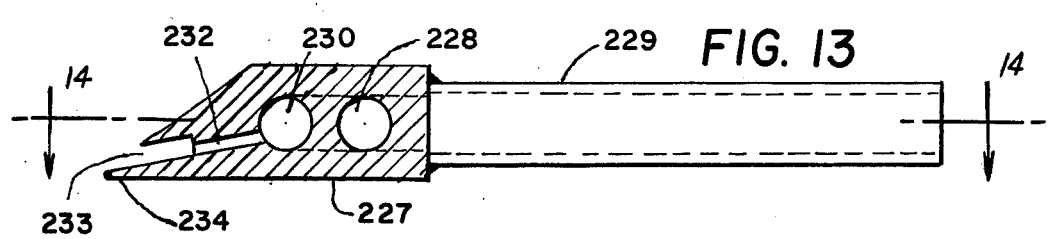
Figure 14:
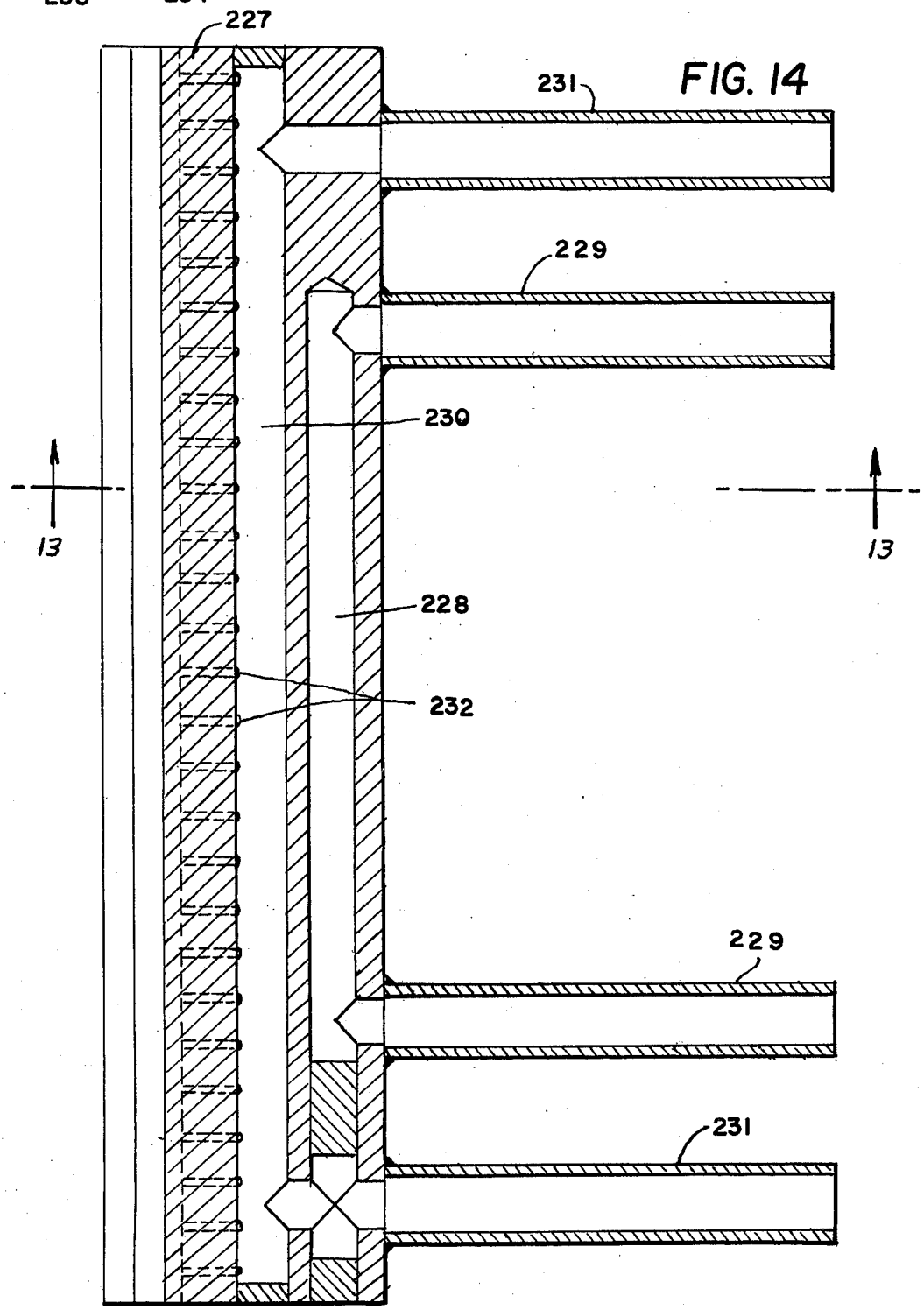

FIGS. 13 and 14 are views illustrating a modified form of equipment for introducing the tertiary gas, FIG. 13 being taken as indicated by the section line 13—13 on FIG. 14 and FIG. 14 being taken as indicated by the section line 14—14 on FIG. 13.

Figure 15:
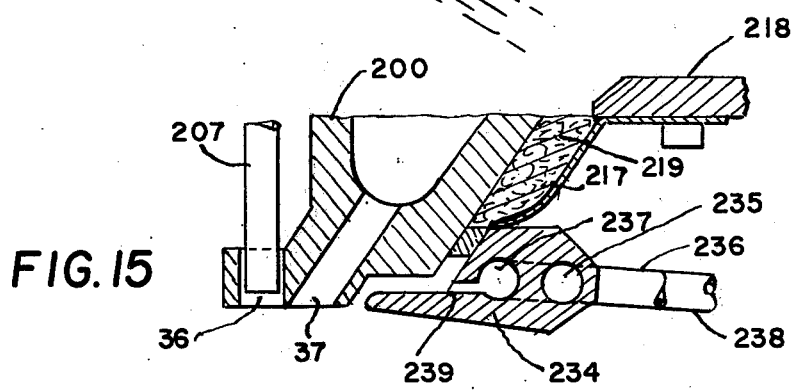

FIGS. 15 and 16 are fragmentary views taken in a manner similar to FIG. 7, but illustrating additional embodiments of the equipment for introducing the tertiary gas.

FIGS. 17 and 18 are views illustrating still another arrangement of parts for establishing fiberizing centers arranged according to the present invention, FIG. 17 being taken in the same general manner as portions of FIG. 5, and FIG. 18 being a fragmentary plan view looking up at certain of the parts shown at FIG. 17.

TORATION

The terms "toration," a noun, and "torate," a verb, as mentioned above and as used herein, constitute contractions of the words "tornado" and "attenuation" and are used to denote the action on an attenuable material in the zone of interaction created when a blast, or first jet, is penetrated by a transversely oriented second jet, the latter being completely encompassed or enveloped by the former. Clearly defined and forceful currents, including two counterrotating tornadoes, or whirls, or vortices, having substantial angular velocity, are generated by the interaction of the two jets, and these currents, by frictional licking or sweeping against the surface of the attenuable material, exert forces tending to induce the attenuable material to flow toward and into the zone of interaction; the material then is brought more and more under the influence of the tornadoes and forms itself into an elongated cone from the tip of which a fine fiber is drawn by the combined flows of the jets. It is surprising that, although located in a whirling zone with very high velocities, the glass cone nevertheless is stable and that its cross section reduces progressively from its base at the plane of emission to its tip, from which a single fiber starts. It is also very surprising that this fiber, although, at least part of the time, it has a nearly helicoidal movement at an increasing amplitude and velocity, continuously emanates from the cone in a continuous attenuation process.

The virtual lack of slugs in the fiber manufactured by toration is due to the dimensional and positional stability of the glass cone and to the continuity of the unique fiber attenuation.

The interaction phenomenon as described hereabove and which is of fundamental importance to the invention, can occur with a plate limiting one of the borders of the blast and through which the secondary jet is flowing. This same phenomenon can take place in embodiments, such as that of FIG. 12 described in the parent application Ser. No. 353,984, in which the plate is so small that it is virtually non-existant, or even without any plate. The interaction phenomenon is essentially the same, whether or not there is a plate. Since we prefer to employ at least some form of plate, although it may be of quite limited extent, in the following description we emphasize embodiments in which there is a plate.

FIG. 1

Figure 1:
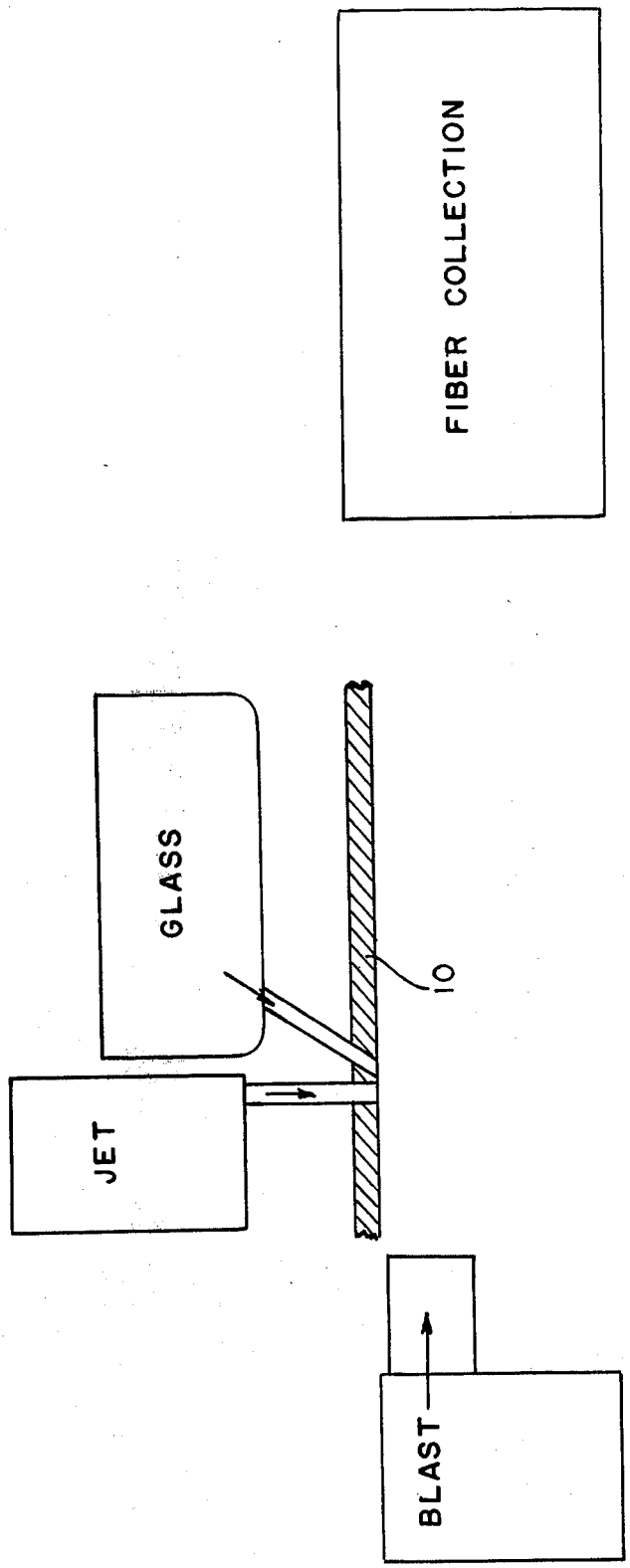
FIG. 1 is a diagrammatic representation of the major components of one system according to the invention, showing the general interrelation of the components for producing a blast and for producing a jet transverse to the blast, as well as the glass supply means and the fiber collection device.

Referring first to FIG. 1, a blast, or primary jet source, is indicated at the left, being arranged to deliver the blast along a surface, in this case the under-surface, of a plate or wall 10. The source of a secondary jet is also indicated, being arranged to deliver through the plate 10 so as to penetrate into the blast. The attenuable material, such as glass, is also delivered through the plate 10, and in the embodiment of FIG. 1 the point of delivery of the glass into the blast is just downstream of the point of delivery of the jet into the blast. An appropriate fiber collection means is indicated at the right in FIG. 1.

GENERAL STATEMENT OF VARIABLES

One possible way to control the quantity, quality, and size of the resulting fibers is by regulating the flow rate of the attenuable material. The regulation of the flow rate of attenuable material can be accomplished in a number of ways, e.g., by varying the temperature of the attenuable material so as to alter its viscosity characteristics. In the case of glass, generally speaking, the higher the temperature the lower the viscosity; further, when changes in the constituents of the glass are made so as to obtain different fiber quality, in view of its end use, such changes in the constituents of the glass can effect changes in the viscosity at a given temperature.

Other parameters which can be manipulated in order to control toration include the blast and jet fluid compositions, and the temperatures and the velocities of the blast and the jet. Typically, the interacting jets are composed of the same fluid, such as the products of combustion resulting from the burning of a suitable gaseous fuel, and in such circumstances the performance of toration, throughout a considerable temperature range, can be gauged in terms of the relative velocities of the primary and secondary jets. However, it must be kept in view that any substantial differences between the densities, or the viscosities, of the two jets can have a quite considerable impact on toration, and these additional factors can be accommodated in toration by taking account of the kinetic energies of the fluid streams, rather than just their velocities. The kinetic energy of a given volumetric unit of a fluid stream is directly proportional to the product obtained by multiplying its density by the square of its velocity.

In order to effect toration, the kinetic energy of the jet per unit of volume must be greater than that of the blast in the operational area thereof.

Additional control over the results obtainable by toration can be exercised by varying the orifice sizes, positions and configuration, particularly with respect to the secondary jet. Additional refinements to the basic apparatus are discussed below with respect to the various illustrated embodiments of the present invention.

ANALYSIS OF TORATION—FIG. 2

Figure 2:
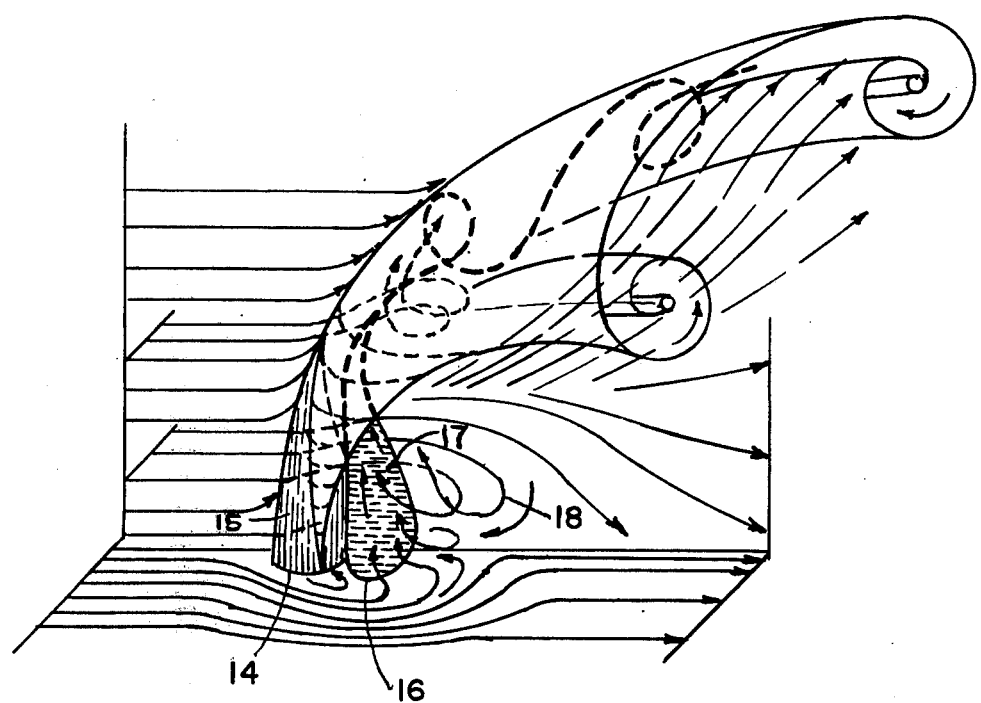
FIG. 2 is a diagrammatic perspective view, of the action at a fiberizing center according to said parent application and showing a pattern of flow of gases and glass which is typical of toration, this view being inverted as compared with FIG. 1, that is, showing the glass and jet flowing upwardly instead of downwardly.

In further explanation of the operative forces responsible for toration, reference is made to FIG. 2 which presents, in part, our actual observations and, in part, our theoretical suggestions and conclusions as to the zone of interaction created by intersecting jets and as to the resultant fluid flow which gives rise to the whirl or miniature tornado phenomena hereinbefore referred to as being of importance in toration. The FIG. 2 shows the same general arrangement of the components of a fiberizing center as in FIG. 1, but shows the secondary jet in inverted position as compared to FIG. 1, that is the jet is directed upwardly instead of downwardly, and further FIG. 2 is on a very much enlarged scale as compared to FIG. 1. It is to be understood that the toration fiberizing center may be arranged in any desired relation to the horizontal.

In the representation of toration as appearing in FIG. 2, the principal jet or blast travels from left to right. The secondary jet 15 is oriented substantially perpendicular to the principal jet and, in a sense, can be said to intercept it, with respect to a part of the blast. The relative relationship of the principal jet and the secondary jet is such that the secondary jet is completely enveloped by the principal jet. The significance of this operative relationship will become more readily apparent from the analysis of the complete process of toration which is presented herebelow.

Reference herein is repeatedly made to "upstream" and "downstream"; unless the context clearly requires a different meaning, these terms have reference to the flow of the blast.

JET INTERACTION ACTIVITY

The blast splits and flows around the secondary jet while the secondary jet substantially maintains its thrust and its integrity, and can be said to pierce through the blast.

Since the secondary jet is unconfined (in the sense that is not within a tube or other solid-walled flow passage), its flow at its periphery induces some fluid of the blast to flow along with it, that is, some fluid of the blast is carried along with the flow of the secondary jet. The interaction results in the generation of a region of relatively reduced pressure that is, negative pressure, immediately downstream of the secondary jet.

The split portions of the blast flow around the secondary jet toward the negative pressure region and thus rejoin each other to form strong recirculation currents shown in FIG. 2 by blast flows arrows 18 which curve right around on themselves, and also curve upwardly, and indicate flow having a component generally from right to left, countercurrent to the blast which, as above mentioned, is flowing generally from left to right.

The extent of the negative pressure region is a function of the ratio of the kinetic energies, per unit of volume, of the blast and jet. In the upstream-downstream sense the negative pressure region extends about 2 to 3 jet orifice diameters and in the lateral sense it extends about 1 to 2 jet orifice diameters.

The zone of interaction of the blast and the jet gives rise to the formation of two oppositely rotating tornadoes, or whirls, one on each side of the secondary jet slightly downstream of the midpoint thereof. As clearly shown in FIG. 2, these two tornadoes, or embryonic, vortices, swell substantially as they whirl upwardly and turn in a downstream direction.

Thus, the zone of interaction is characterized by the inception of the two oppositely rotating tornadoes and by a region of negative pressure immediately downstream of the base of the secondary jet, the negative pressure being quite pronounced in the region between the bases of the tornadoes and in the region immediately downstream thereof.

As the secondary jet loses its individuality, that is, its initial velocity and direction characteristics, it gives rise to a new flow, a mixture of the jet and blast which can be called a torating flow or torating blast.

The layers of the blast which are adjacent the jet and flow alongside it give the tornadoes their direction of rotation. As a result of this direction of rotation, a fluid particle placed on the outer layers of either tornado would be carried over toward the concavity of the above mentioned double volute, being caught by the two tornadoes like between two counter rotating calendar rollers.

While the outer layers of the tornadoes rotate at velocities which are identical to the velocities of the layers of the blast adjacent the tornadoes, the interior or central portion of each of the tornadoes turns arounds its own axis at very high speed. Thus, each tornado has an induction effect, in an inward and upward direction, on the adjacent portions of the blast which are flowing around the secondary jet. The induced flow is directed upwardly along and inwardly into the concavity constituting the deformed shape of the residual secondary jet flow and of the mixing layer.

It is surprising that, while the fluid flows at very high velocities in the central portion of each of the tornadoes, these tornadoes are nevertheless stable; their apexes appear to be affixed to the edge of the secondary jet orifice, slightly downstream of the axis thereof, and the gaseous envelopes of the tornadoes are practically immobile.

ACTION ON GLASS

The glass is either emitted directly into the low pressure zone immediately downstream of the secondary jet, or is drawn into this zone in situations in which it is supplied some distance from it. The flow of the glass into this region can be relied upon to take place clearly, even if the glass emission orifice in the plate 10 is not located immediately adjacent the downstream side of the secondary jet. This is so because the recirculation currents, discussed above are quite pronounced and strong. Stated in another way, the glass localizes in the region of negative pressure just downstream of the secondary jet.

When viewed as in FIG. 2, the glass is drawn upwardly under the combined action of the gaseous currents and with the glass orifice 16 in a plate at the boundary of the blast, forms itself into a stable cone. Within the body of the glass, the glass travels out into the cone, essentially by laminar flow, and continuously, uniformly and progressively decreases in cross section as it flows toward the apex of the cone. The steady diminution in cross section is important to the production of a fixer of substantially uniform diameter along its length and insures the continuity of fiberizing.

From inspection of FIG. 2 it can be seen that the diminution in cross section of the glass takes place during, and in phase with, the expansion in the cross section of the two tornadoes, the flow of the glass into the cone occurring within the concavity formed by the tornadoes and the downstream side of the secondary jet. Thus, the glass cone is protected or shielded from the disruptive impact which the blast would have upon it. A resultant is the stability of the flow of the glass which is an important characteristic of toration.

Next to the plate the tornadoes or whirls are of very small cross section and the frictional surface interaction thereof against the glass is of quite limited extent. At locations progressively farther and farther away from the plate, the tornadoes are progressively larger and larger and have progressively larger surface contact with the glass, the consequence being that the tornadoes have a progressively increasing influence on the glass attenuation.

What has been described thus far comprises a process for delivering attenuable material in a molten state at a steady reproducible rate, and in a stream of cross section which is continuously and progressively reducing, into a region in which it can be drawn out into a fine fiber. In other words, the description up to this point concerns the supplying of the glass, in a molten state, to a region of high velocity gaseous flow.

The final phase of the attenuating process, i.e., the drawing out of the attenuable material into very fine fibers, takes place within a short length of glass flow from the tip of the cone and extends for only about 3 to 5 jet secondary orifice diameters.

Toration is characterized by dramatically dynamic action. While we have witnessed the behavior of the glass by the naked eye and by means of high speed motion pictures, the experience undergone by the attenuable material occurs far too fast to be seen by the naked eye, and even too fast to be clearly captured by motion pictures. We have made extensive studies using motion pictures taken at 4,000, 6,500 and 10,000 frames per second and projected at speeds down to one frame per second. These studies have shown with certainty that from one cone tip there is only one single fiber drawn; but there remains an element of uncertainty as to the exact path of travel of this fiber.

What has been observed, particularly by means of the high speed motion pictures above mentioned, is a smooth continuously repititous, whipping action which appears to occur in a single plane but which more probably, because of the rotational nature of the whirling or vortical motion in the region of attenuation, actually follows a helical path, the pitch and the amplitude of which are increasing in the flow direction, for at least a substantial part of the time.

The whipping action of the fibers being attenuated, sometimes causes a fiber to touch against various parts of the equipment, particularly the plate through which the attenuable material is emitted and especially in the region thereof downstream of the fiberizing center. If the equipment so touched by the fiber is hot, there may be a tendency for the fiber to stick, in which case a length of fiber may melt and drop into the product as a piece of unfiberized material.

Figure 3:
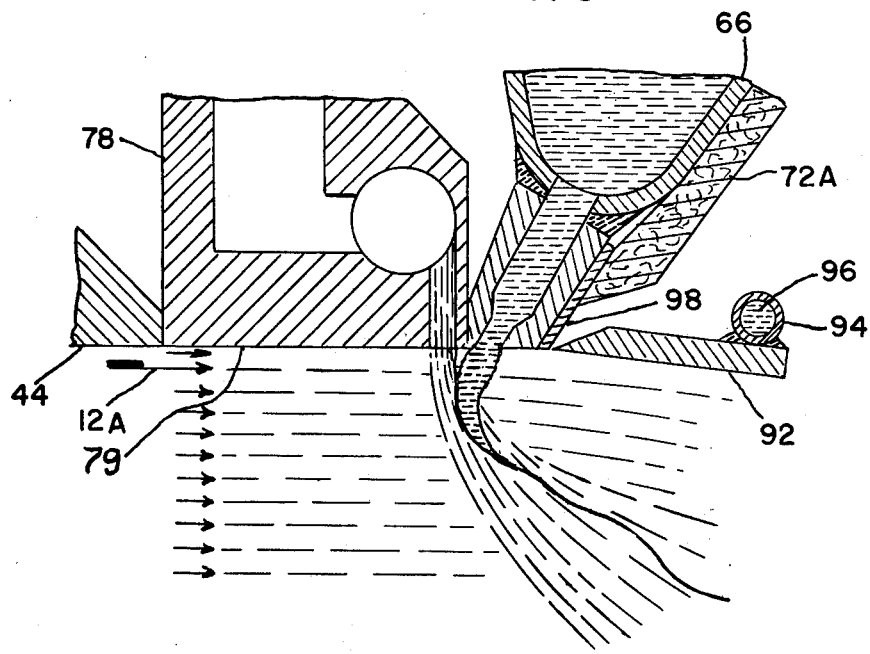
FIG. 3 is a sectional view of an embodiment, in which a water cooled plate is utilized adjacent the path of the blast downstream of the fiberizing center.
Figure 4:
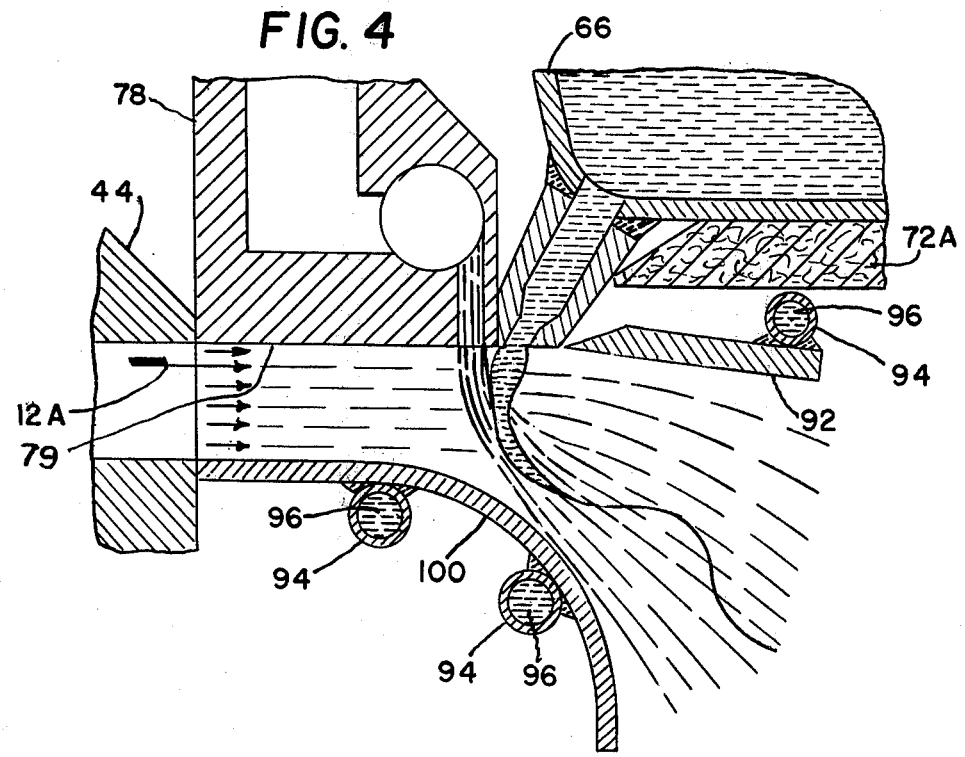
FIG. 4 is a view similar to FIG. 3 but further showing the use of a water cooled deflector adjacent the side of the gas blast opposite to the fiberizing center.

Certain provisions for minimizing such risk of the sticking of fibers, and also for avoiding undesirable cooling of the bottom of the crucible, are illustrated in FIGS. 3 and 4, which show alternative embodiments also incorporating still other features, as will be seen from the following.

FIG. 3

The arrangement of FIG. 3 includes a downstream metal plate 92 having a cooling tube 94 mounted in heat transfer relation to the plate in order to provide for circulation of a cooling liquid 96. The plate 92 is advantageously formed of a metal having good heat conduction characteristics, for instance copper. With this arrangement, even if the whipping action of the fibers being formed brings the fibers into contact with the surface 92, the fibers will not have a tendency to stick and build up because of the fact that the surface is cooled. An arrangement of this kind aids in avoiding possible accumulation of fibers on the surface of the equipment.

With further reference to FIG. 3, the burner lips are indicated at 44, and a carrier jet chamber is indicated at 78, the glass crucible being shown at 66. However, in FIG. 3 an asbestos board 72A is applied to the crucible 66 in a position to aid in minimizing heat loss, thereby maintaining the desired crucible and glass temperature especially in the region of feed of the glass to the glass supply orifice. Such an insulating shield may be employed in a position more or less directly exposed to the blast, but in installations having a blast defining wall element or surface which is cooled, such as the downstream plate 92, the plate is interposed between the gaseous flow and the shielded crucible.

The plate 92, however, is extended in the upstream direction to a point relatively close to the glass supply port, and in order to avoid excessive cooling of the glass adjacent to the discharge orifice, a protective shield of mica indicated at 98 may be introduced. The plate 92 may be oriented, with respect to the plane of the bottom wall 79 of chamber 78, that is, the plane of emission, at a slight angle, as shown. We have found that an angle of between about 3° and about 20° is appropriate, and we prefer an angle in the lower end of this range.

FIG. 4

A similar arrangement of components is shown in FIG. 4 but in FIG. 4 there is further illustrated a lower deflector 100 arranged at the side of the blast opposite to the fiberizing center and preferably curved downwardly in the region opposite to the fiberizing center. This deflector 100 is also desirably provided with pipes 94 in heat exchange relation to the deflector and serving to carry a coolant 96 so that in the event that the whipping action of the fiber causes it to touch the deflector 100, the fiber will not stick to the surface of the deflector.

With respect to the wall elements 92 and 100, it is to be noted that these elements aid in deflecting the flow of gases, particularly downstream of the fiberizing center, and this aids in stabilizing toration, as well as in reducing the risk of the fibers adhering to the surfaces of the equipment.

A noticeable difference in the posture of the cone of attenuable material is observed, particularly when the lower deflector 100 is employed. In the latter case, the tip of the cone of attenuable material appears to project more directly into the core of the blast.

The downstream plate 92 and the lower deflector 100 constitute effective means for guiding and stabilizing the flow resulting from the interaction of the two jets, more or less independently of the velocities of the jets, which makes possible the production of a fiber of highly constant quality. In other words, the downstream plate 92 and deflector 100 constitute means for broadening the range of conditions under which successful operations can be performed for favorably influencing the quality of the fibers produced, although it is pointed out that other embodiments of the equipment are also capable of producing high quality fibers, without the use of such plates or deflectors.

Multiple fiberizing centers are desirably provided in order to maximize production with given equipment and one arrangement for achieving the multiplication of the fiberizing centers is to provide one or more series of fiberizing centers spaced from each other in a zone extended transversely or laterally of the blast.

FIGS. 5–18

These figures illustrate certain improvements and variations both in apparatus and in method as compared with various of the arrangements shown in the parent application Ser. No. 353,984.

One aspect of the arrangements of these figures relates to the employment of plate or wall elements positioned at the boundary of the blast downstream from the location of the point of entry of the molten glass or other attenuable material, such plates being disclosed for instance in FIGS. 3 and 4. Such a downstream plate may be positioned at an angle to the blast which is indicated at 12A, in which event the downstream plate acts to deflect the blast, as clearly appears in FIGS. 3 and 4.

In fiberization where such a downstream plate is employed, the fibers some times tend to adhere to the plate, and this is particularly true where the plate is positioned at an angle in order to deflect the blast.

One of the purposes of the technique according to FIGS. 5 to 18 is to reduce tendency for fibers to adhere to and accumulate upon a downstream plate or wall element. For this purpose, the arrangement provides for the introduction of a tertiary gas supply, for instance the introduction of air into the blast in the region of the upstream edge of the downstream plate and in a position, with respect to the flow of the blast, which is just downstream of the orifice through which the molten glass is admitted. Such introduction of air at the upstream edge of the plate results in development of a boundary layer of air at the surface of the plate presented to the blast, and this tends to avoid adherence and build up of glass upon the surface of the plate.

In equipment having a plurality of fiberizing stations spaced from each other transversely of the blast and each including both a secondary jet penetrating the blast and an orifice for introduction of the molten glass, the arrangement for introducing the tertiary gas may comprise either a series of individual jets, each one aligned with one of the fiberizing stations, or a gas admission slot extended transversely of the blast. In either event, the admission of the tertiary gas tends to establish a curtain or boundary layer of gas at the surface of the downstream plate presented to the blast, and also has a tendency to cause the stream of molten glass introduced through the glass orifice to penetrate farther into the blast before the fiber is drawn from the glass stream.

According to another aspect of the arrangements disclosed in certain of FIGS. 5–18, a unitary structure is provided in the region in which both the secondary jet and the glass are delivered to the blast. Certain purposes of this unitary structure are related to the problem of establishing and maintaining accurate alignment of the secondary jet and the glass admission orifice in the direction upstream and downstream of the blast, and this problem is of a special importance in equipment embodying a multiplicity of fiberizing centers, each including a secondary jet and a glass orifice, and arranged in a series spaced from each other transversely of the blast.

In toration it is important, for uniformity of the fibers produced, that in each fiberization center the secondary jet and the glass admission orifice be accurately aligned with each other upstream and downstream of the blast. one technique for achieving accuracy of alignment in the upstream and downstream sense as disclosed above in this application is to employ a series of separate secondary jets, but only a single glass orifice, the orifice being in the form of an elongated slot extended transversely of the blast in a position which, with respect to the blast, is downstream of the jets, as shown for example in FIGS. 12, 12A, 13A and 13B of the parent application Ser. No. 353,984. In the arrangement using the slot, under the influence of the individual secondary jets, the molten glass is delivered to the blast from the slot only at spaced points transversely of the blast, one such point being accurately located downstream of each of the secondary jets.

According to certain of the modified arrangements here under consideration, instead of utilizing a glass admission slot, a crucible or bushing for the glass is provided with a series of transversely spaced glass admission orifices. This crucible or bushing further is provided with a plate or wall structure adjacent to the glass admission orifices at the side thereof which, with relation to the flow of the blast, is upstream of the glass admission orifices. This upstream plate is formed unitarily, preferably integrally with the crucible or bushing, and is provided with a series of bores or apertures formed therein, one aligned with each one of the glass admission orifices. By providing a common or unitary structure in which both the glass admission orifices and the secondary jet admission orifices are formed or drilled, accurate alignment of each pair of orifices is more readily achieved. Because of the proximity of these orifices the temperature of the carrier jet influences the temperature of the glass stream, which makes possible control of glass stream temperature by regulating the temperature of the carrier jet.

In combination with the upstream plate formed unitarily with the crucible or bushing, this arrangement also provides a new and improved form of device for delivering the secondary jets through the orifices provided in said unitary plate. This improved arrangement includes the use of individual tubes from which the secondary jets are discharged, such tubes being of slightly smaller outside diameter than the diameter of the secondary jet orifices in the unitary upstream plate, and these jet tubes project into but not through the jet orifices. Preferably the jet tubes are mounted in groups. For instance, in an arrangement in which the bushing is provided with approximately 80 glass admission orifices, the tubes are arranged and mounted in groups of approximately 20 and each such group is also preferably separately supplied with the jet gas. Although, for most glass formulations it would be contemplated to employ platinum alloys for the unitary crucible and upstream plate, the arrangement described just above with the provision of separate jet tubes, permits the fabrication of the unitary plate and crucible of platinum alloys, while the tubes and the associated mounting and gas supply means are fabricated from less expensive metals, such as stainless steel. It is also of advantage, especially where the crucible and upstream plate is formed of platinum and the jet tubes are formed of stainless steel to provide for the mounting and supply of the jet tubes in groups representing a subdivision of the total associated with a multiple orifice bushing, because subdivision into groups more readily accommodates differential thermal expansion and contraction as between the structure of the crucible on the one hand and the structure of the jet tubes and the jet mounting and supply structures on the other hand.

For purposes of protection of the jet tubes in the region where they project into the jet apertures in the upstream plate which is unitarily formed with the crucible or bushing, the individual jet tubes are desirably coated with an insulating material, for instance alumina.

The embodiment illustrated in FIGS. 5 to 12 is described just below.

In the following description a few of the reference symbols already used are also employed in this description for corresponding items, but most of the reference characters are new ones, beginning with number 200.

The general arrangement (see particularly FIGS. 5 to 8) includes a fiberizing crucible or bushing 200 associated with a glass supply forehearth 201, although it is to be understood that instead of supplying the molten glass from a forehearth of a glass forming furnace, a resistively heated melting crucible may be employed to melt and supply the forming glass.

As in other embodiments, the crucible of FIGS. 5 to 8 is provided with a series of glass discharge orifices 37, adapted to deliver the glass into the zone of interaction between a primary jet or blast and a series of secondary or carrier jets, one such carrier jet being associated with each glass supply orifice in order to establish a plurality of fiberizing centers. As in the other embodiments, the blast is indicated by the arrow 12A (see FIG. 9) and the jets are delivered from jet supply tubes (to be described hereinafter) through jet orifices 36 (also referred to more fully hereinafter).

The blast is delivered from the duct 202, the blast being generated by combustion of fuel in the combustion chamber 203 (see FIG. 5) which may be supplied with a mixture of gas and air at 204.

A burner 205 supplied with a mixture of gas and air at 206 provides the gas to be delivered through the orifices 36 through the jet tubes above referred to. The arrangement of these parts which establishes each of the fiberizing centers is shown to best advantage in FIGS. 7 and 9. As there illustrated, it will be seen that jet tubes 207 which are supplied from the burner 205 in the manner to be explained below, project into the apertures 36 and deliver jets or gas streams transversely into the blast 12A discharged from the duct 202. As shown in the embodiment of FIGS. 5 to 12, the jet orifices 36 are formed in a wall or lip 208 lying adjacent to the boundary of the blast 12A and formed unitarily, preferably integrally with the crucible 200.

Each fiberizing center provided as just described functions in the general manner fully disclosed in earlier parts of this specification, and the parameters including the kinetic energy of the blast and the secondary jet in the operational area thereof and the temperatures and velocities of the blast and jet, as well as the temperature of the glass, relationship between the size of the glass and the jet orifices, the spacing thereof and the like, may all conform with those parameters referred to above and fully set out in the present application Ser. No. 353,984.

One of the improvements involved in the modification here under consideration relates to the employment of a "downstream" wall or plate element of the general kind shown in FIGS. 3 and 4. Such a plate is referred to as a "downstream" plate because it is situated, with respect to the direction of flow of the blast 12A, in a position downstream of the fiberizing center, i.e. downstream of the glass orifice 37, which in turn is located downstream of the secondary jet orifice 36. The downstream plate is especially illustrated in FIGS. 5, 7 and 9, being identified in general by the reference numeral 209. As seen in FIG. 5, the downstream plate is mounted by means of joint linkage 210 which provides for adjustment of the position and inclination of the plate. In these figures, the plate 209 is adjusted to a position which is inclined so as to deflect the blast after it passes the glass discharge orifice.

The downstream plate is provided with a passage 211, with connections 212, providing for the circulation of a cooling medium, for instance water, through the channel 211 thereby effecting cooling of the downstream plate.

As mentioned above, the employment of a wall or plate downstream of the fiberizing centers some times results in tendency for the fibers to contact the plate and thereby tends to build up deposits of glass upon the surface of the plate presented to the blast. According to the present improvements, this tendency is substantially eliminated by special provision of means for introducing air, preferably in the form of a boundary layer along the lower surface of the downstream plate or along the leading or upstream edge of the plate. The air or gas for this purpose may for convenience be referred to as the "tertiary jet".

In the embodiment of FIGS. 5 to 12, the leading edge 213 is positioned in slightly spaced relation to the lower portion of the crucible 200, so that a slot is provided between the crucible and the leading edge of the plate, through which slot tertiary gas may be supplied in a region which, with relation to the direction of flow of the blast, is downstream of the glass orifices 37. The plate 209 has a channel 214 formed therein, with connections 215 for supply of the tertiary gas, for instance air. A series of ports 216 communicates with the supply channel 214 and delivers air in an upstream direction toward the leading edge of the downstream plate, thereby supplying the air for entry through the slot adjacent to the crucible. In order to close the space between the crucible and downstream plate and thus assure that the tertiary gas will not escape and will be delivered through the slot at the leading edge of the plate, a sheet metal plate 217 is connected with the mounting structure 218, with the lower edge of the plate turned upwardly to engage the lower wall of the crucible, and thereby provide a space to accommodate a fibrous insulating material 219 of high thermal resistance, such as aluminum oxide fiber. The enclosure plate 217 may advantageously be formed of stainless steel having some appreciable resilience and is configured to establish contact with the plate 209, thereby closing the space between the crucible and the plate.

With this arrangement, and with the enclosure 217 made of resilient material, the downstream plate may be adjusted in position in the manner described above while retaining engagement of the enclosure 217.

The action of the tertiary jet is indicated in FIG. 9 of the drawings, in which flow lines indicate not only the blast 12A and the secondary jet from the jet tube 207, but also the tertiary jet delivered from the passage 216 to the leading edge of the plate, at which point the tertiary air passes through the slot and enters the system at the boundary of the blast, producing a current or boundary layer at the lower surface of the plate 209. The equipment includes a plurality of fiberizing centers of the kind shown in FIG. 9 spaced from each other transversely of the blast. It is contemplated that a tertiary gas passage 216 be provided in alignment with each secondary jet orifice 36 and its associated glass admission orifice 37. With a plurality of tertiary gas delivery passages, the tertiary gas from the several passages tends to merge and thus form a more or less complete curtain of gas as the flow passes through the slot and follows the lower surface of the downstream plate at the boundary of the blast. Because of this, the fibers being formed are effectively prevented from contacting the surface of the downstream plate.

It is also pointed out that the provision of the tertiary gas supply channel 214 and the flow of the tertiary gas over the surfaces of the downstream plate assists in cooling the plate, so that the action of the tertiary gas, together with the action of the cooling medium circulating through the channel 211 will maintain the plate at a relatively low temperature, which is also of benefit in avoiding sticking of glass to the surface of the plate.

In an installation in which a large number of fiberizing centers are provided in spaced relation transversely of the blast, for instance in the neighborhood of 80 fiberizing centers, it is preferred to sectionalize the downstream plate. As seen in FIGS. 6 and 11, the downstream plate associated with the multiplicity of fiberizing stations there shown, is sectionalized and formed in three sections, each one of which is provided with a water cooling channel 211 and a tertiary gas supply channel 214, respectively having water circulating and air supply connections as already described. Forming the plate in such sections facilitates effective and accurate circulation of the cooling water and assures accurate distributing of the tertiary gas supply, thereby assisting in maintaining the desired operating conditions within close tolerances.

Turning now to the arrangement of the secondary jets as embodied in FIGS. 5 to 12, it is again pointed out that an upstream plate 208 is preferably formed integrally with the crucible 200, this structure desirably being made of platinum when employing typical glass formulations used for fiber manufacture. For the purposes of ensuring accurate fiber formation, and particularly for the purpose of assuring uniformity of fiber formation at each of the multiplicity of stations, it is of importance to provide accurate upstream-downstream alignment of the secondary jet orifices 36 and the glass admission orifices 37. In FIGS. 12, 12A, 13A and 13B of the parent application Ser. No. 353,984, this accuracy of upstream-downstream alignment of the secondary jet and the stream of glass to be fiberized is automatically achieved by the employment of an elongated slot for the admission of glass, rather than a series of separately formed glass admission orifices, as has already been noted above. The arrangement shown in FIGS. 5 to 12 also provides for accuracy of alignment of the secondary jets with the streams of glass, but in this case, the accuracy of alignment is provided for notwithstanding the use of separate glass admission orifices. This accuracy is assured by virtue of the unitary formation of the wall or upstream plate 208 with the crucible 200. Since both the secondary jet orifices and the glass orifices are drilled in the same unitary structure, accuracy of alignment is provided for and will be maintained even under varying conditions of thermal expansion and contraction of various parts of the structure.

This accuracy of alignment is further facilitated by virtue of certain other arrangements included in the embodiment shown in FIGS. 5 to 12. Thus, from examination of FIGS. 6, 7, 8, 11 and 12, it will be seen that each secondary jet is delivered from a jet tube 207 which extends into the orifice 36, the jet tube 207 being of slightly smaller diameter than the diameter of the orifice 36. The jet tubes 207 are subdivided into groups, four such groups being shown in the embodiment illustrated and each group is mounted upon a jet fluid manifold 220 which is connected with the supply pipe 221. By this subdivision of the total number of jet tubes and the separate mounting of each group, thermal expansion and contraction of the manifold which mounts and supplies each group, is more readily accommodated than would be the case if all of the jet tubes were mounted on a single structure extended throughout the entire series of fiberizing stations. Moreover, by utilizing jet tubes 207 projecting into individual drilled jet orifices 36, and by employing jet tubes of slightly smaller outside diameter than the diameter of the orifices, additional clearance is provided for accommodation of expansion and contraction. The grouping of the jet tubes and the arrangement and mounting thereof as just described in order to provide for accommodation of expansion and contraction is particularly important where, as here contemplated, the crucible 200 and the upstream plate 208 are formed of platinum alloys and the jet tubes and associated parts are formed of some other less expensive metal such as stainless steel, because these different metals have different coefficient of thermal expansion and contraction.

As best seen in FIG. 12 and each group of jet tubes 207, together with its mounting manifold 220 and the associated supply connection 221 form a structure generally resembling a rake, and this structure is adapted to be mounted at the base end of the supply connection 221. As seen in FIGS. 5 and 6, the supply connections 221 are adapted to communicate with the burner 205 for developing the secondary jet gas, and preferably provision is made for introducing air into the gas stream entering each supply connection 221. This is accomplished by supply means in the form of a fitting 223 (see also FIG. 10) interposed between the burner chamber 205 and the mounting plates 222 for the supply connections 221 for the groups of jet tubes. This "air diluter" is provided with air supply pipes 224 connected therewith through the tubes 225, there being several of the supply pipes 224 distributed along the length of the air diluter, the tubes 225 delivering the air to the passages 226 in the air diluter. One such passage 226 is provided for each of the groups of secondary jet tubes, and in this manner the jet tubes are supplied with diluted products from the combustion chamber 205. The dilution of the gases coming from the combustion chamber 205 is important because of the use of those gases in the jet tubes 207 and the contemplated employment of less expensive metal than the platinum alloys used for the crucible. As already indicated, stainless steel is appropriate for the jet tubes 207, but will not withstand the temperatures generated in the combustion chamber 205 without dilution.

As will be seen from FIGS. 6, 8 and 11, there is included an "outboard" secondary jet orifice 36 and a secondary tube 207 laterally offset beyond each end of the glass admission orifices 37. This is in conformity with the disclosure of other multiple orifice arrangements described in the parent application Ser. No. 353,984, and assures uniform fiberizing activity at the glass admission orifices at the opposite ends of the series. In addition to this provision, it is contemplated according to arrangements disclosed herein that a similar provision be made with respect to the tertiary gas admission passages. In other words, as will be seen from FIGS. 6, 8 and 11, there is a tertiary gas admission passage located in offset relation beyond each end of the series of glass admission orifices, this arrangement being provided for reasons similar to those referred to in connection with the offset or "outboard" secondary jet orifices.

A modified form of downstream plate and tertiary jet supply is illustrated in FIGS. 13 and 14. Here the downstream plate is shown at 227, being provided with a cooling medium circulation channel 228 with connections 229, and also with an air supply channel 230, with supply connections 231. Here the individual passages or ports 232 which deliver the tertiary air from the supply channel 230 connect with the base of a groove or slot 233 having an open edge presented toward and just above the leading edge 234 of the downstream plate. It will be understood that this structure is adapted to be mounted in relation to the fiberizing stations in the same general manner as described above with respect to FIG. 5. The downstream plate of FIGS. 13 and 14 is also adapted to cooperate with a structure for closing the space between the downstream plate and the crucible in the same manner as indicated at 217 and 219 in FIGS. 5, 7 and 9. A slot such as shown at 233 may be employed to assist in the spreading of the tertiary gas along the upstream edge of the plate, and thereby assist in providing a blanket of the tertiary gas between the surface of the plate and the blast.

Still another modified form of construction of the downstream plate and the tertiary gas supply is illustrated in FIG. 15. As here shown, the lower portion of the crucible 200 is of somewhat modified configuration and the downstream plate 234 is also of modified shape adapted to cooperate with the lower portion of the crucible in the manner mentioned just below. The plate 234 is provided with a cooling medium circulating channel 235 with connections 236 and the tertiary gas supply channel 237 has supply connections 238, with passages 239 which communicate with a slot like chamber or passage formed between the leading edge portion of the plate 234 and the bottom portion of the crucible. Sealing means is also provided between the plate and the crucible to insure flow of the tertiary gas in the desired direction and out of the slot at the leading edge of the plate, as will now be understood.

Still another modified arrangement of the downstream plate is shown in FIG. 16. In this embodiment, the crucible is again indicated at 200, having an upstream plate 208 with orifices 36 cooperating with jet tubes 207. Here the construction of the downstream plate 209 is essentially the same as that described above with reference to FIGS. 5 to 12, but the system for sealing the space between the plate and crucible is different. Thus, the downstream plate is provided with an upper metallic closure strip 240 which is extended along the length of the plate 209 and cooperates with the lower portion of the plate in defining an elongated slot for admission of the tertiary gas into the blast. This structure is here thermally isolated from the crucible by means of a layer of insulating material such as indicated at 241 overlying the wall 240. The insulation 241 may for example comprise a layer of material of high thermal resistance, such as alumina. Insulation of this kind and also the insulation 219 described above is of advantage in the equipment in order to minimize heat loss from the crucible.

In all of the embodiments described above, wherever the jet tubes 207 are employed projecting into orifices formed in a structure integral with the crucible, it is desirable to provide thermal insulation between the jet tubes and the jet orifices. This is advantageously provided by applying a thermal insulating coating to the tubes, for instance a coating of alumina. This also diminishes heat loss from the crucible and in addition will serve to protect the metal of the jet tubes.

All of the arrangements described just above are also adaptable to an installation of the general kind shown in FIG. 5 in which the crucible is mounted below a glass supply forehearth indicated at 201, the crucible being isolated or insulated from the glass supply structure by a ceramic insulation element 242, in which a tube 243 for a cooling medium is embedded (see FIGS. 5 and 6). High temperature fibrous insulating material 244 is also desirably used as indicated at the lower side of adjoining surfaces of the forehearth in order to retard thermal loss in this region.

For at least some purposes, it is also preferred to provide electrical connections such as indicated at 245, connected to and extended from the ends of the crucible 200 and provided for resistive heating of the crucible.

Still another embodiment of equipment incorporating tertiary gas supply means is disclosed in FIGS. 17 and 18. In this embodiment the glass supply forehearth or the like is indicated at 246 and the crucible or bushing at the bottom is indicated at 247. The glass supply orifices are again indicated by the number 37 and in this case the secondary jets are supplied through orifices 36 provided in the projections 248 which extend from the secondary jet gas supply manifold 249. A supply conduit 250 is connection with the manifold 249.

The blast 12A is delivered from the structure 251, with the upper boundary of the blast close to the secondary jet and glass orifices 36 and 37.

At the downstream side of the orifices 37, a downstream plate structure indicated at 252 is provided, this structure being hollow to provide a manifold 253 supplied by supply duct 254. The manifold is provided with projecting nozzle structures 255 having orifices 256 for discharge of the tertiary air in a position which, with respect to the direction of flow of the blast is downstream of the fiberizing center established by the glass and secondary jet orifices.

As is shown in FIG. 18, the secondary orifices, the glass supply orifices and the tertiary gas orifices are arranged in groups aligned with respect to each other in the upstream and downstream sense, and each group providing a fiberizing center.

It will be noted that in the arrangements of FIGS. 17 and 18, a downstream plate is provided without employing any circulation passage for a cooling liquid, the arrangement being such as to provide for cooling of the downstream plate by virtue of the hollow contruction of the plate and the flow of the air through the interior hollow of the plate.

With regard to the operation of the fiberizing system when employing tertiary gas as herein disclosed, it is pointed out that the air employed may have a pressure of the order of 0.5 to 2 bars, preferably between about 0.8 and 1.2 bars.

In an installation having about 80 fiberizing stations as in the embodiment of FIGS. 5 to 12, the air flow used for the tertiary gas supply may be of the order of 15 to 30 $m^3$ per hour, preferably about 17 to 25 $m^3$.

The kinetic energy of the tertiary jet should be considerably lower than the kinetic energy of the secondary jet.

We claim:

1. Equipment for making glass fibers comprising supply means for molten glass having a discharge orifice, means for establishing a gaseous blast directed in a path with a boundary of the blast adjacent the glass discharge orifice, means for establishing a gaseous jet directed in a path transverse to the path of the blast and penetrating the blast at a location upstream of the glass orifice, the jet being of smaller width than the width of the blast and separate plate means positioned downstream of the jet along the path of travel of the blast.

2. Equipment as defined in claim 1 and further including thermal shielding means for shielding the glass supply means from the blast on the downstream side of the glass discharge orifice.

3. Equipment as defined in claim 1 in which said plate means comprises a plate adjacent said boundary of the blast in a position to deflect the blast.

4. Equipment as defined in claim 1 in which the plate has cooling means associated therewith.

5. Equipment for making glass fibers comprising supply means for molten glass having a discharge orifice, means for establishing a gaseous blast directed in a path with a boundary of the blast adjacent the glass discharge orifice, wall elements at least in part defining at least a plurality of the boundaries of the blast, and means for establishing a gaseous jet directed in a path transverse to the path of the blast and in a position to penetrate the blast at a location upstream of the glass orifice, the jet being of smaller width than the width of the blast, the molten glass discharge orifice opening through one of said wall elements, the means for establishing a gaseous jet comprising a jet orifice which opens through said one of said wall elements, and a second of said wall elements being arranged at a position at a side of said blast so that it is opposite said glass and jet orifices, said second wall element having a curved portion positioned to widen the blast flow path opposite said orifices.

6. Equipment as defined in claim 5 in which said curved portion comprises a plate having cooling means associated therewith.

7. Equipment as defined in claim 5 and further including separate plate means positioned downstream of the jet along the path of travel of the blast.

8. Equipment for making fibers comprising supply means for molten attenuable material having a discharge orifice, means for establising a gaseous blast directed in a path with a boundary of the blast adjacent the discharge orifice, means for establishing a gaseous jet in a path transverse to the path of the blast and penetrating the blast at a location upstream of said orifice, the jet being of smaller width than the width of the blast, separate plate means positioned downstream of the jet along the path of travel of the blast, and means for introducing a current of gas into the blast downstream of said discharge orifice in the region of the upstream edge of the plate means.

9. Equipment as defined in claim 8 in which the plate means has a gas supply channel therein having port means directed toward the leading edge of the plate means and serving to establish said current of gas in the region of the leading edge of the plate means.

10. Equipment as defined in claim 9 in which the plate means is further provided with a channel for circulation of a cooling medium.

11. Equipment as defined in claim 8 in which a plurality of discharge orifices for attenuable material are provided in spaced relation transversely of the blast, in which separate means are provided for establishing a gaseous jet upstream of each orifice, and in which the means for introducing a current of gas in the region of the upstream edge of the plate means includes a separate gas discharge orifice space downstream of each discharge orifice.

12. Equipment as defined in claim 8 in which a plurality of discharge orifices for attenuable material are provided in spaced relation transversely of the blast, in which separate means are provided for establishing a gaseous jet upstream of each orifice, and in which the means for introducing a current of gas in the region of the upstream edge of the plate means includes a gas discharge slot extended along the discharge orifices and delivering gas to the upstream edge of the plate means.

13. Equipment as defined in claim 12 in which the plate means has a gas supply channel, and separate gas passages interconnecting said channel and the discharge slot, said separate gas passages being respectively positioned one downstream of each orifice for attenuable material.

14. Equipment for making glass fibers comprising means for establishing a gaseous blast, means for establishing a gaseous jet of smaller size than the blast, with the jet directed transversely of and penetrating into the blast and thereby develop a zone of interaction between the blast and jet at the downstream side of the jet, the kinetic energy of the jet per unit of volume being greater than that of the portion of the blast which flows through the operational area thereof, supply means for effecting delivery of molten glass so that it will enter said zone of interaction, and means delivering a current of gas to the boundary of the blast downstream of said zone of interaction.

15. Apparatus for making glass fibers from attenuable molten glass comprising means for establishing a gaseous blast, structure at a side of the blast defining a boundary thereof, means for delivering a gaseous carrier jet transversely into the blast through said boundary thereof, means for delivering a stream of molten glass through said structure and to said boundary of the blast in a position, with relation to the blast, which is adjacent and downstream of the carrier jet, and means for delivering a current of gas into the blast in a position, with relation to the blast, which is adjacent and downstream of the stream of molten glass.

16. Apparatus as defined in claim 15 in which means are provided for delivering a plurality of carrier jets and a plurality of streams of molten glass at points spaced from each other laterally of the gaseous blast, and separate laterally spaced inlet openings for delivering a plurality of currents of gas downstream of the glass streams.

17. Apparatus as defined in claim 15 in which means are provided for delivering a plurality of carrier jets and a plurality of streams of molten glass at points spaced from each other laterally of the gaseous blast, and a gas discharge slot extended laterally of the blast for introducing a current of air downstream of a plurality of the glass streams.

18. A method for making fibers from attenuable molten material comprising establishing a gaseous blast directed in one path, introducing the molten material into the blast by establishing a gaseous carrier jet of smaller cross section than and which penetrates the blast in a path transverse to the path of the blast and feeding a stream of the molten material into the blast in a position, with reference to the blast, which is adjacent and downstream of the carrier jet, and introducing a current of gas into the blast in a position, with reference to the blast, which is downstream of the point of introducing the molten material.

19. Equipment for making fibers comprising means for establishing a gaseous blast, and a plurality of fiberizing centers associated with the blast and spaced from each other transversely of the blast, each fiberizing center including a supply orifice for attenuable material and said fiberizing centers including a common wall structure adjacent a boundary of the blast having a series of apertures respectively positioned, with respect to the blast, upstream of each supply orifice, and means for directing a separate gaseous jet through each of said apertures comprising a gas discharge tube extended into each aperture in said common wall structure and delivering a gaseous jet into the blast.

20. Equipment as defined in claim 19 in which the total number of gas discharge tubes are divided into groups, and means for mounting and supplying gas to the tubes of each group separately from the tubes of other groups, the several mounting and supplying means having freedome for expansion and contraction independently of each other.

21. Equipment as defined in claim 19 in which each of said tubes is surrounded by a layer of heat insulating material within the aperture in said common wall structure.

22. Apparatus for making glass fibers from attenuable molten glass comprising means establishing a gaseous blast, means for delivering a stream of molten glass to a boundary of the blast, structure adjacent said boundary and having an aperture therein located in a position, with respect to the blast, which is upstream of the stream of glass, and means for directing a gaseous jet through said aperture and into the blast including a gas discharge tube extended into said aperture and delivering a gaseous jet into the blast.

23. Apparatus as defined in claim 22 in which the gas discharge tube is coated with a heat insulating material within said aperture.

24. Apparatus for making glass fibers from attenuable molten glass comprising means establishing a gaseous blast, a reservoir for molten glass comprising a metallic receptacle having an orifice for delivery of a stream of molten glass to a boundary of the blast, a wall structure formed integrally with said receptacle and extended therefrom adjacent said boundary of the blast in a direction upstream of the blast, said wall structure having an aperture therethrough adjacent to the upstream side of the glass delivery orifice, and means for delivering a gaseous jet through said aperture including a gas carrying tube positioned to direct gas through said aperture and deliver the gas from said aperture as a jet penetrating the blast adjacent to the glass stream.

25. Apparatus for making glass fibers from attenuable molten glass comprising means establishing a gaseous blast, a reservoir for molten glass comprising a metallic receptacle of elongated shape extended transversely of the blast and having a series of orifices for delivery of streams of molten glass to a boundary of the blast, an elongated wall structure formed integrally with said receptacle adjacent to the glass delivery orifices, the wall structure projecting laterally from the receptacle adjacent said boundary of the blast in a direction upstream of the blast, said wall structure having a series of apertures therethrough providing for delivery of gaseous jets therethrough and into the blast, the apertures and the glass orifices being aligned in pairs upstream and downstream of the blast to provide a series of fiberizing stations, and electrical connections with the metallic glass receptacle providing for resistance heating thereof, the electrical connections being attached to the ends of the receptacle.

26. Apparatus for making glass fibers from attenuable molten glass comprising means establishing a gaseous blast, a reservoir for molten glass comprising a metallic receptacle of elongated shape extended transversely of the blast and having a series of orifices for delivery of streams of molten glass to a boundary of the blast, an elongated wall structure formed integrally with said receptacle adjacent to the glass delivery orifices, the wall structure projecting laterally from the receptacle adjacent said boundary of the blast in a direction upstream of the blast, said wall structure having a series of apertures therethrough, with said apertures and the glass delivery orifices aligned in pairs upstream and downstream of the blast, and means for delivering gaseous jets through said apertures including a series of gas carrying tubes positioned respectively to direct gas through said apertures and deliver the gas from said apertures as jets penetrating the blast adjacent to the glass streams and thereby provide a series of fiberizing stations.

27. Apparatus as defined in claim 26 in which each gas carrying tube is of smaller outside diameter than the diameter of the apertures and in which said tubes extend into said apertures.

28. Apparatus as defined in claim 27 in which the tubes are mounted in groups, each group having a separate mounting structure having freedom for thermal expansion and contraction independently of each other.

29. Apparatus for making glass fibers from attenuable molten glass comprising means establishing a gaseous blast, means for delivering a stream of molten glass to a boundary of the blast, structure adjacent said boundary and having an aperture therein located in a position, with respect to the blast, which is upstream of the stream of glass, means for directing a gaseous jet through said aperture and into the blast including a gas discharge tube extended into said aperture and delivering a gaseous jet into the blast, and means for supplying gas to said tube comprising a combustion chamber with a connection for delivering products of combustion to the jet tube and means for diluting said products of combustion with air before delivery to the jet tube.

30. Apparatus as defined in claim 29 in which said structure adjacent the blast boundary is formed of platinum and in which the jet tube is formed of stainless steel and further in which the jet tube is coated with a heat insulating material within said aperture.

* * * * *

UNITED STATES PATENT AND TRADEMARK OFFICE
CERTIFICATE OF CORRECTION

PATENT NO. : 4,015,963
DATED : April 5, 1977
INVENTOR(S) : Marcel Levecque, J. A. Battigelli & D. Plantard It is certified that error appears in the above-identified patent and that said Letters Patent are hereby corrected as shown below:

Col. 1, line 6, "invention" should read --application--;

Col. 2, line 4, "along" should read --alone--;
line 44, "aptyl" should read --aptly--;

Col. 3, line 1, after "forehearth" delete "hearth";
line 48, "reference" should read --references--;

Col. 4, line 66, "complete" should read --compete--;

Col. 6, line 2, "(item 4)" should read --(item 14)--;
line 43, "home" should read --known--;
line 47, "product" should read --produce--

Col. 12, line 1, "fixer" should read --fiber--

Signed and Sealed this sixteenth Day of August 1977

[SEAL]

Attest:

RUTH C. MASON
Attesting Officer

C. MARSHALL DANN
Commissioner of Patents and Trademarks